US012645555B1

(12) United States Patent
Lee

(10) Patent No.: US 12,645,555 B1
(45) Date of Patent: Jun. 2, 2026

(54) SYSTEMS AND METHODS FOR DETERMINISTIC CONFORMANCE SUITES, VALIDATOR IMPLEMENTATION CERTIFICATION, AND VERIFIABLE CERTIFICATE REGISTRIES FOR REPLAY-VERIFIABLE CONFORMANCE RECEIPTS

(71) Applicant: Yong Bok Lee, Sheridan, WY (US)

(72) Inventor: Yong Bok Lee, Sheridan, WY (US)

(73) Assignee: STONE & INK ARCHIVE LLC, Sheridan, WY (US)

( * ) Notice: Subject to any disclaimer, the term of this patent is extended or adjusted under 35 U.S.C. 154(b) by 0 days.

(21) Appl. No.: 19/445,488

(22) Filed: Jan. 10, 2026

Related U.S. Application Data

(63) Continuation of application No. 19/444,722, filed on Jan. 9, 2026.

(51) Int. Cl.
| | |
|---|---|
| *G06F 11/20* | (2006.01) |
| *G06F 11/22* | (2006.01) |
| *G06F 11/24* | (2006.01) |

(52) U.S. Cl.
CPC .......... *G06F 11/24* (2013.01); *G06F 11/2236* (2013.01)

(58) Field of Classification Search
CPC ............................ G06F 11/2236; G06F 11/24
See application file for complete search history.

(56) References Cited

U.S. PATENT DOCUMENTS

| | | | |
|---|---|---|---|
| 6,985,445 | B1 | 1/2006 | Hao et al. |
| 7,237,014 | B2 | 6/2007 | Drummond, II |
| 7,342,892 | B2 | 3/2008 | Soon et al. |
| 7,809,685 | B2 | 10/2010 | Wolff |
| 8,214,421 | B2 | 7/2012 | Cherian et al. |
| 8,453,226 | B2 | 5/2013 | Hammad |
| 8,719,576 | B2 | 5/2014 | Buldas et al. |
| 9,354,998 | B2 | 5/2016 | Hyland et al. |

(Continued)

OTHER PUBLICATIONS

Haber & Stornetta, "How to Time-Stamp a Digital Document," CRYPTO '90 (LNCS 537), 1991.

(Continued)

*Primary Examiner* — Philip Guyton
*Assistant Examiner* — Sean Kevin McNamara

(57) ABSTRACT

Disclosed is a fail-closed conformance control layer for machine-assisted decision artifacts. The system generates replay-verifiable receipts that commit to a canonical artifact digest, evidence and snapshot identifiers, assumptions, toolchain identifiers, and a policy pack identifier and policy version digest. A deterministic validator evaluates a receipt under the versioned policy pack to output PASS, FAIL, or HOLD with reason codes from a reason-code registry, including time-stamped modeled-variability codes. Downstream side effects are gated in a control path and permitted only on PASS; otherwise they are withheld or routed to remediation or human review. The system may emit portable conformance packs and revalidate receipts over time to detect drift and manage a certification lifecycle. Conformance suites with deterministic test vectors and expected validator outputs may certify validator implementations by issuing signed conformance certificates and publishing a certificate or certificate digest to a verifiable certificate registry for independent verification and procurement acceptance testing.

30 Claims, 10 Drawing Sheets

(56) References Cited

U.S. PATENT DOCUMENTS

| | | | |
|---|---|---|---|
| 9,898,393 | B2 | 2/2018 | Moorthi et al. |
| 10,581,613 | B2 | 3/2020 | Ford et al. |
| 10,586,260 | B2 | 3/2020 | Alsina et al. |
| 10,599,957 | B2 | 3/2020 | Walters et al. |
| 10,762,444 | B2 | 9/2020 | Fly et al. |
| 10,817,873 | B2 | 10/2020 | Paolini-Subramanya et al. |
| 11,010,265 | B2 | 5/2021 | Wu et al. |
| 11,108,559 | B2 | 8/2021 | Resch et al. |
| 11,244,076 | B2 | 2/2022 | Sutton et al. |
| 11,922,280 | B2 | 3/2024 | Wenchel et al. |
| 12,368,576 | B2 | 7/2025 | Formaini et al. |

OTHER PUBLICATIONS

Merkle, "A Digital Signature Based on a Conventional Encryption Function," CRYPTO '87 (LNCS 293), 1988.

Laurie et al., "Certificate Transparency," RFC 6962, 2013.

Laurie et al., "Certificate Transparency Version 2.0," RFC 9162, 2021.

Rundgren et al., "JSON Canonicalization Scheme (JCS)," RFC 8785, 2020.

Jones et al., "JSON Web Signature (JWS)," RFC 7515, 2015.

Bormann & Hoffman, "CBOR," RFC 8949, 2020.

Schaad, "COSE: Structures and Process," RFC 9052, 2022.

Samuel et al., "Survivable Key Compromise in Software Update Systems," ACM CCS, 2010.

Torres-Arias et al., "in-toto: Providing farm-to-table guarantees for bits and bytes," USENIX Security, 2019.

FIG. 4

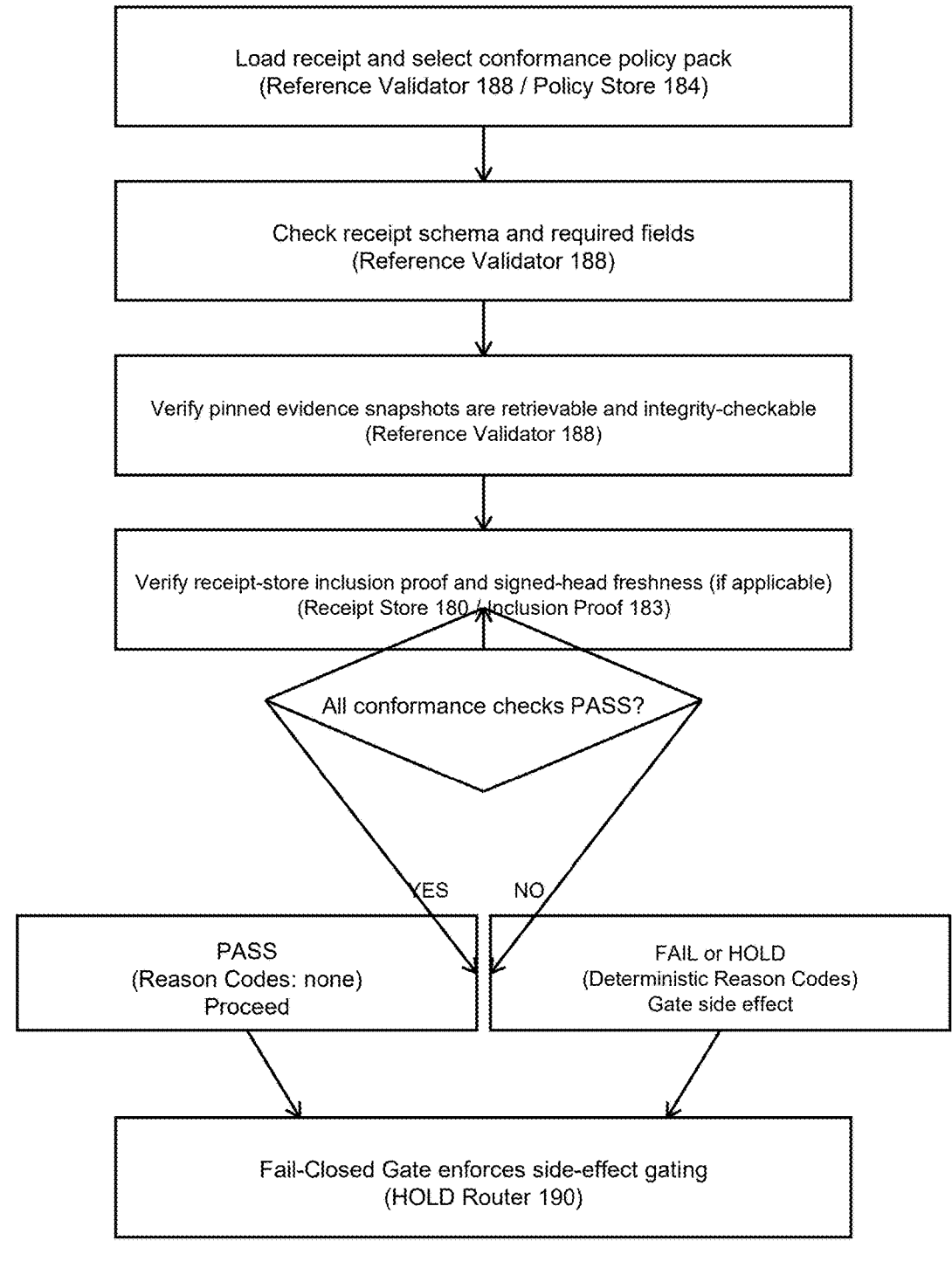

Load receipt and select conformance policy pack
(Reference Validator 188 / Policy Store 184)

Check receipt schema and required fields
(Reference Validator 188)

Verify pinned evidence snapshots are retrievable and integrity-checkable
(Reference Validator 188)

Verify receipt-store inclusion proof and signed-head freshness (if applicable)
(Receipt Store 180 / Inclusion Proof 183)

All conformance checks PASS?

YES          NO

PASS
(Reason Codes: none)
Proceed

FAIL or HOLD
(Deterministic Reason Codes)
Gate side effect

Fail-Closed Gate enforces side-effect gating
(HOLD Router 190)

FIG. 8

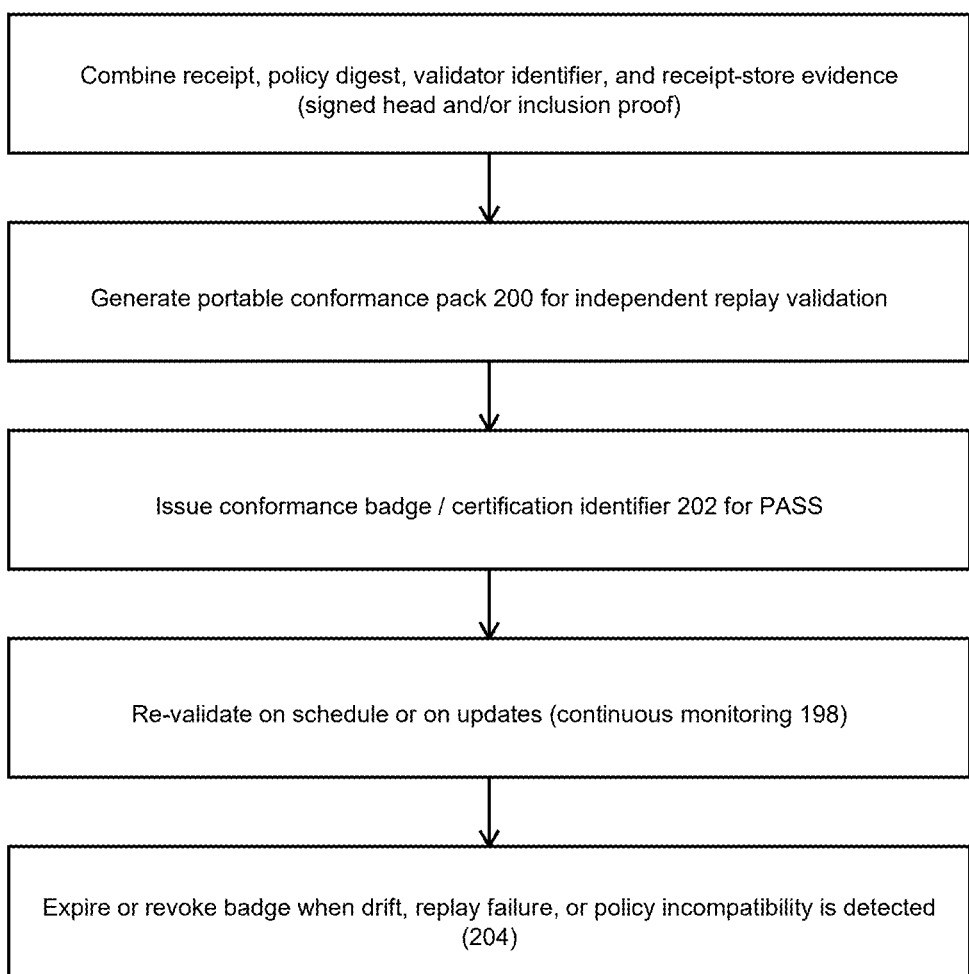

Combine receipt, policy digest, validator identifier, and receipt-store evidence (signed head and/or inclusion proof)

Generate portable conformance pack 200 for independent replay validation

Issue conformance badge / certification identifier 202 for PASS

Re-validate on schedule or on updates (continuous monitoring 198)

Expire or revoke badge when drift, replay failure, or policy incompatibility is detected (204)

FIG. 9

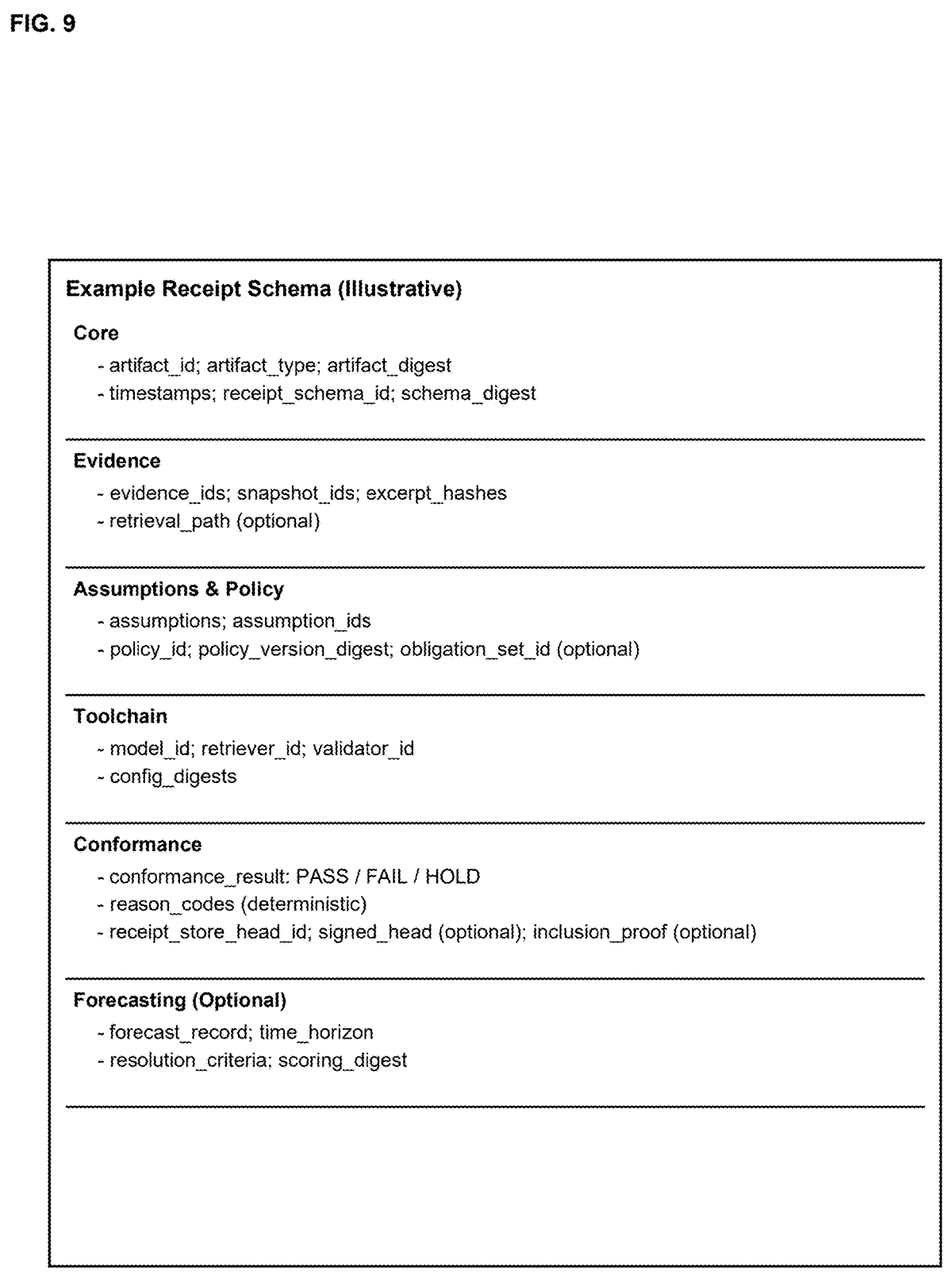

Example Receipt Schema (Illustrative)

Core

- artifact_id; artifact_type; artifact_digest
- timestamps; receipt_schema_id; schema_digest

Evidence

- evidence_ids; snapshot_ids; excerpt_hashes
- retrieval_path (optional)

Assumptions & Policy

- assumptions; assumption_ids
- policy_id; policy_version_digest; obligation_set_id (optional)

Toolchain

- model_id; retriever_id; validator_id
- config_digests

Conformance

- conformance_result: PASS / FAIL / HOLD
- reason_codes (deterministic)
- receipt_store_head_id; signed_head (optional); inclusion_proof (optional)

Forecasting (Optional)

- forecast_record; time_horizon
- resolution_criteria; scoring_digest

SYSTEMS AND METHODS FOR DETERMINISTIC CONFORMANCE SUITES, VALIDATOR IMPLEMENTATION CERTIFICATION, AND VERIFIABLE CERTIFICATE REGISTRIES FOR REPLAY-VERIFIABLE CONFORMANCE RECEIPTS

CROSS-REFERENCE TO RELATED APPLICATIONS

Continuation and priority. This application is a continuation of U.S. patent application Ser. No. 19/444,722, filed Jan. 9, 2026, titled "SYSTEMS AND METHODS FOR REPLAY-VERIFIABLE CONFORMANCE RECEIPTS, DETERMINISTIC VALIDATION, FAIL-CLOSED ROUTING, AND CONTINUOUS CONFORMANCE MONITORING AND CERTIFICATION FOR MACHINE-ASSISTED DECISION ARTIFACTS," which claims the benefit of U.S. Provisional Application No. 63/954,264, filed Jan. 5, 2026, titled "Replay-Verifiable Conformance Receipts, Deterministic Validation, Fail-Closed Routing, and Continuous Certification for Machine-Assisted Decision Artifacts."

Incorporation by reference. The entirety of each above-referenced application is incorporated herein by reference to the extent not inconsistent with the present disclosure. In the event of any inconsistency, the present Specification, including Appendix A (Glossary), controls.

STATEMENT REGARDING FEDERALLY SPONSORED RESEARCH

None.

NON-TRADEMARK NOTICE

"RVAL," "Receipt," "Conformance Pack," "Conformance Suite," "Test Vector," "Conformance Certificate," "Certificate Registry," "Reasoning Receipt," "Forecasting Receipt," "PASS/FAIL/HOLD," "Badge," "Certification," and related labels are technical shorthand used for convenience. No trademark rights are asserted herein. The scope of the invention is defined solely by the claims.

FIELD

The present disclosure relates to computer systems for governance, auditability, and conformance of machine-assisted outputs, including replay-verifiable receipts, deterministic validation under versioned conformance policies, machine-readable reason codes, fail-closed (HOLD) routing for downstream side effects, and continuous post-deployment conformance monitoring and certification for high-stakes decision workflows. In some embodiments, these techniques improve safety and accountability and help protect users and other affected parties, including vulnerable individuals and communities, by preventing externalized effects unless conformance is established. This sentence is illustrative and non-limiting.

In some embodiments, the disclosed systems further provide conformance suites comprising deterministic test vectors and expected validator outputs, and computer-implemented certification of validator implementations based on such test vectors, including publication of digitally signed conformance certificates to a certificate registry and certificate validity evidence for independent verification and procurement acceptance testing. This paragraph is illustrative and non-limiting.

BACKGROUND

Modern machine learning systems, including large language models, probabilistic models, and retrieval-augmented pipelines, are increasingly used to assist with high-stakes decisions in governance, compliance, healthcare administration, legal/policy analysis, and risk management.

Common practice is to attach citations, screenshots, or narrative rationales to machine-assisted outputs. However, such attachments are often not replayable: sources drift, links rot, model versions change, retrieval stacks evolve, and prompts/configurations vary.

When outputs are not replayable, organizations cannot reliably (i) separate supported statements from inference/speculation, (ii) diagnose why two outputs disagree, (iii) regression-test changes across model/tool updates, or (iv) enforce consistent governance requirements across time.

As a result, quiet errors can persist and propagate through decision workflows, creating downstream harms (e.g., incorrect policy memos, unreliable forecasts, opaque administrative decisions) that are difficult to challenge, audit, or correct.

The description provided in this BACKGROUND section is for context only and is not admitted to be prior art as to the present disclosure or any claim thereof.

SUMMARY

The disclosure provides a conformance and auditability control layer that produces replay-verifiable receipts and deterministic validator outcomes for machine-assisted decision artifacts. In some embodiments, the control layer fails closed by gating downstream side effects until conformance conditions are satisfied.

Unified control-path conformance concept (informative; non-limiting). In some embodiments, receipt generation, deterministic validation under versioned policy packs, fail-closed routing of downstream side effects, and continuous monitoring/certification are coordinated aspects of a single conformance control layer configured to prevent externalized effects unless replay-verifiable conformance evidence is present and deterministically evaluates to PASS under an applicable policy version digest.

Single technical nucleus/shared substrate (informative; non-limiting). In some embodiments, the disclosed receipt generation, deterministic validation under a versioned conformance policy pack, and fail-closed gating of downstream side effects share a single technical nucleus: generating a replay-verifiable receipt that commits to defined identifiers and digests, and applying a deterministic reference validator under the applicable policy version digest to produce a conformance outcome that controls release of a downstream side effect.

In some embodiments, the system generates a Receipt that commits to (i) an artifact identifier and artifact digest, (ii) pinned evidence identifiers and/or archived snapshots, (iii) explicit assumptions and/or assumption identifiers, (iv) policy and/or profile identifiers and version digests, and (v) toolchain identifiers and/or configuration digests (model, retriever, validator, scoring configuration). In some embodiments, the Receipt further commits to a conformance context digest (CCD) computed over a canonical encoding of at least: a receipt schema identifier and schema digest; a canonicalization identifier (canonicalization_id); a policy pack identifier and policy version digest; a validator identifier and validator digest; and a reason-code registry identifier and registry digest (and, optionally, an obligation-set registry digest), such that substitution of any component of the conformance boundary is deterministically detectable.

In some embodiments, the system executes a Reference Validator that checks receipt completeness and replayability metadata under a versioned conformance policy (also referred to herein as a minimal-auditability policy), emitting a deterministic PASS/FAIL/HOLD result with one or more deterministic reason-code identifiers. In some embodiments, the deterministic reason-code identifiers are bound to a reason-code registry identifier and registry digest, and any mismatch deterministically yields a non-PASS.

Conformance suite and test vectors (illustrative; non-limiting). In some embodiments, the reference validator is distributed with a conformance suite comprising deterministic test vectors and expected validator outputs for one or more profiles and conformance levels, enabling independent parties to validate implementations and detect deviations.

Validator and policy-pack substitution resistance (illustrative; non-limiting). In some embodiments, the conformance result is accepted for gating only when the receipt and/or conformance pack commits to (i) a validator identifier and validator digest and (ii) a policy pack identifier and policy version digest, and, optionally, commits to one or more additional conformance-boundary components including a receipt schema identifier and schema digest, a canonicalization identifier, and a reason-code registry identifier and registry digest, and/or commits to a conformance context digest computed over a canonical encoding of at least the foregoing identifiers and digests, such that substitution of any committed component (including validator substitution, policy-pack substitution, schema substitution, canonicalization substitution, or reason-code-registry substitution) is deterministically detectable and yields a non-PASS outcome with deterministic reason codes.

Validator-implementation certification via conformance suites (illustrative; non-limiting). In some embodiments, the conformance layer includes or is distributed with a conformance suite comprising deterministic test vectors and expected validator outputs for a versioned conformance profile bound to at least a policy pack identifier and policy version digest. In some embodiments, the system executes at least a subset of the deterministic test vectors against an implementation under test (IUT) configured to validate replay-verifiable conformance receipts, receives test-vector outputs comprising an outcome selected from PASS, FAIL, or HOLD and one or more deterministic reason-code identifiers associated with a reason-code registry, and compares the outputs to the expected validator outputs to determine whether the IUT conforms to the versioned conformance profile.

Digitally signed conformance certificate (illustrative; non-limiting). In some embodiments, upon determining conformance of the IUT, the system generates a digitally signed conformance certificate, the signature being computed over a canonical encoding of at least a certificate core, that commits to at least: (i) a conformance suite identifier and a conformance suite digest, (ii) the policy pack identifier and policy version digest, (iii) a validator identifier for the IUT and a validator digest of the IUT, and (iv) a certificate validity condition comprising at least one of a validity time window, a revocation reference, a revalidation cadence, or a regression-trigger rule, and, optionally, (v) one or more conformance-boundary commitments including a reason-code registry identifier and registry digest, a canonicalization identifier, and/or a conformance context digest computed over a canonical encoding of at least the foregoing identifiers and digests, such that substitution of any committed component is deterministically detectable and yields a non-PASS outcome when certification coverage is required for gating.

Certificate registry and verifiable publication (illustrative; non-limiting). In some embodiments, the digitally signed conformance certificate, or a digest thereof, is published to a certificate registry, optionally implemented as an append-only verifiable log that publishes signed heads and supports inclusion proofs, enabling independent parties to verify certificate publication and validity status without trusting the registry operator. In some embodiments, acceptance of verification is conditioned on a freshness policy requiring that a signed head or an integrity-protected checkpoint used for verification satisfy a recency bound. In some embodiments, publication evidence includes cross-registry linking in which a head or checkpoint of one registry commits to a head or checkpoint of another registry, enabling independent verification of coordinated status without trusting either operator.

Certification-conditioned acceptance for gating (illustrative; non-limiting). In some embodiments, acceptance of a conformance determination for purposes of releasing a downstream side effect is conditioned on verifying that the validator used to produce the determination is covered by a non-revoked conformance certificate that commits to the applicable policy version digest and validator digest, such that validator substitution is detectable and deterministically yields a non-PASS outcome with reason codes.

Approval/release receipts and revocation/supersession receipts (illustrative; non-limiting). In some embodiments, when a downstream side effect is released after conformance PASS (or when release is authorized subject to policy-defined conditions), the system emits an approval receipt (also referred to as a release receipt) that commits to at least: (i) a receipt identifier or receipt digest for the underlying decision artifact, (ii) a policy pack identifier and policy version digest, (iii) a control point identifier or control point class for the side effect, (iv) an Approval Authority identifier or Approver Class (human or automated) and an approval timestamp, and (v) an enforcement decision record identifier or digest, such that the release is independently auditable.

In some embodiments, when a previously approved or certified assertion is withdrawn, superseded, or invalidated, the system emits a revocation receipt (or supersession receipt) that commits to at least: (i) an identifier or digest of the approval receipt, badge, certificate, or conformance statement being revoked or superseded, (ii) a revocation or supersession reason code, (iii) an effective time (and optionally a scope), and (iv) a signature or integrity protection, enabling independent reviewers to detect that reliance is no longer permitted under the applicable policy version digest.

Non-limiting note. Approval/release and revocation/supersession receipts are examples of additional receipt classes evaluated and logged over the same receipt/validator/policy-pack substrate and do not limit claim scope; the claims control.

Reliance boundary and reliance decision records (illustrative; non-limiting). In some embodiments, reliance on an approval receipt, conformance statement, conformance pack, badge, certificate, permit, or other asserted conformance artifact is mediated by a reliance boundary in a control path, such that an operation that depends on the assertion is permitted only when reliance admissibility is established. In some embodiments, the reliance boundary emits a reliance outcome selected from ALLOW, DENY, or HOLD (or functionally equivalent outcomes) with deterministic reason codes, and records a reliance decision record bound to at least the relied-upon object identifier/digest and an applicable policy version digest.

Reliance state machine (illustrative; non-limiting). In some embodiments, the system maintains a reliance state for an asserted conformance artifact selected from at least ACTIVE, EXPIRED, REVOKED, or SUPERSEDED based on approval/release receipts and revocation/supersession receipts, including effective-time and scope rules, and uses the reliance state to deterministically control whether reliance is permitted.

Propagation and stale-reliance prevention (illustrative; non-limiting). In some embodiments, revocation/supersession events are propagated to one or more reliance boundaries using at least one of an invalidation epoch, a version vector, a monotonic counter, or functionally equivalent mechanisms, and reliance is deterministically denied or held when a reliance boundary cannot confirm adoption of required invalidation state under the applicable policy version digest.

Non-separability note for certification embodiments (informative; non-limiting). The conformance suite, certification, and certificate-registry embodiments described herein are illustrative configurations of the same receipt/validator/policy-pack substrate and do not describe separate inventions; they provide mechanisms for independently verifying conformance of validator implementations and do not limit claim scope.

Shared substrate note (informative; non-limiting). In some embodiments, authorized evidence-handle and disclosure-gating mechanisms, conformance suites, validator certification, certificate registries, and continuous conformance monitoring all operate over a shared receipt and conformance substrate and are coordinated aspects of a single conformance-control architecture unless expressly claimed otherwise.

In some embodiments, "Replay" means re-running the same validator checks using pinned identifiers to verify integrity, provenance, and conformance sufficiency under the applicable policy; replay does not assert ground-truth correctness of the artifact.

Deterministic evaluation contract (illustrative; non-limiting). In some embodiments, the reference validator applies a canonicalization function to defined receipt fields and policy-pack fields prior to computing digests and outcomes, such that materially equivalent representations yield identical verification inputs.

Deterministic mapping to outcomes and reason codes. In some embodiments, the conformance result and reason codes are a deterministic function of (i) the canonicalized receipt fields (or defined subset), (ii) a policy pack identifier and policy version digest (and, optionally, a changelog pointer), and (iii) a validator identifier and/or validator digest, and, optionally, (iv) a reason-code registry identifier and registry digest and/or a conformance context digest computed over a canonical encoding of at least the foregoing identifiers and digests, thereby pinning the conformance boundary for replay, except for explicitly modeled variability that is itself recorded, time-stamped, and deterministically reason-coded.

Modeled variability is reason-coded. In some embodiments, checks that depend on external availability or time (e.g., snapshot retrievability, freshness windows) are treated as modeled variability and yield HOLD with deterministic reason codes and timestamps, preventing silent non-determinism. In some embodiments, modeled variability is represented as explicit modeled_variability_parameters that are included in the conformance pack and treated as validator inputs for replay, such that outcomes remain deterministic relative to those parameters.

In some embodiments, the system outputs a non-PASS conformance outcome (e.g., HOLD or FAIL) and performs fail-closed routing that prevents or gates one or more downstream side effects, including publishing, transmitting, committing, auto-finalizing, auto-adjudicating, or otherwise causing an externalized effect based on the decision artifact, until conformance PASS occurs or a remediation workflow is completed.

Control-path gating/TOCTOU latch (illustrative). In some embodiments, the fail-closed gate is in the control path of a side-effecting operation such that no externalized effect (including write/commit/finalize/transmit/execute) is permitted to occur prior to PASS, thereby preventing time-of-check/time-of-use mismatches and inconsistent intermediate states.

Minimum must-pass sets and no-dead-end predicates (illustrative; non-limiting). In some embodiments, a workflow defines a minimum receipt set and one or more control points for a side-effect class, and the fail-closed gate releases the side effect only when each receipt in the minimum set deterministically evaluates to PASS under the applicable policy version digest; any non-PASS state is required to yield deterministic reason codes sufficient to indicate a remediation path, thereby preventing silent bypass or "no-dead-end" failure modes.

In some embodiments, the system produces and stores a portable Conformance Pack comprising at least: (i) the receipt; (ii) a policy/profile identifier and version digest; (iii) validator identifiers and deterministic reason codes; (iv) verifiable receipt-store evidence sufficient for independent replay of the conformance checks; and (v) side-effect gating evidence, or a gating decision record, sufficient to demonstrate that a fail-closed gate prevented release of the side effect until PASS. In some embodiments, the Conformance Pack further includes a digitally signed Conformance Result comprising at least: badge_profile_id; badge_profile_version; validator_version; validator_digest; outcome; fail-_closed_action; deterministic reason-code identifiers; and predicate_results.

Independent replay sufficiency (illustrative; non-limiting). In some embodiments, the conformance pack is sufficient for an independent party to reproduce the conformance determination without access to non-public internal artifacts, by replaying validator checks over pinned identifiers and verifiable log evidence.

Control-path latch/TOCTOU avoidance (illustrative; non-limiting). In some embodiments, the fail-closed gate enforces a control-path latch that prevents a time-of-check/time-of-use inconsistency in which an unverified artifact is externalized prior to conformance PASS.

Conformance Statement+RTES Evidence Pack (illustrative; non-limiting). In some embodiments, the system produces a Conformance Pack that further includes a digitally signed Conformance Statement that declaratively specifies what is being claimed and what is not being claimed, including at least: (i) a claimed conformance level, (ii) a declared action class, (iii) a declared scope-of-use, (iv) covered receipt types, (v) covered control points, (vi) freshness assumptions, (vii) retention window, and (viii) out-of-scope exclusions. In some embodiments, a Conformance Pack packaged for independent review is referred to as an evidence pack (e.g., an "RTES Evidence Pack") comprising the receipt, Conformance Statement, policy/version identifiers and digests, validator identifiers and digests, deterministic reason codes, and verifiable receipt-store evidence sufficient for independent replay of conformance checks. This Conformance Statement is informative and non-limiting and does not alter claim scope; the claims control.

Auditor-mode offline replay+no-raw-payload by default (illustrative; non-limiting). In some embodiments, the Conformance Pack supports an auditor-mode in which an independent reviewer performs offline replay validation using only the Conformance Pack and authorized evidence handles, without requiring access to raw restricted payloads unless explicitly required by an applicable policy. In some embodiments, when required verification dependencies are unavailable or disclosure is constrained, the system deterministically emits HOLD with one or more deterministic reason codes and timestamps, and enforces fail-closed routing to prevent downstream side effects until PASS or remediation completion.

Conformance levels with machine-checkable entry criteria (anti-badge inflation). In some embodiments, the versioned conformance policy may define multiple conformance levels (e.g., L0, L1, L2, and L3), each level being associated with machine-checkable entry criteria defined by the policy pack and/or an obligation set registry, such that issuance or assertion of a level is permitted only when the receipt, validator outputs, and any required gating evidence satisfy the entry criteria for that level under the applicable policy version digest.

Authorized evidence handles and disclosure gating (illustrative; non-limiting). In some embodiments, the conformance layer issues one or more authorized evidence handles usable for replay verification without disclosing raw restricted payloads by default. In some embodiments, an authorized evidence handle is a capability token, reference, locator, escrow key, or functionally equivalent artifact that enables retrieval and/or verification of evidence or snapshots under configured access rules.

Handle constraints bound to receipts (illustrative; non-limiting). In some embodiments, an authorized evidence handle is cryptographically or integrity-preservingly bound to at least one of a receipt digest, a conformance pack digest, a policy version digest, an auditor identity (or auditor class), a scope-of-use declaration, and a validity window, such that misuse, replay outside scope, or substitution is detectable and deterministically yields a non-PASS outcome with reason codes.

Privacy-preserving verification responses (illustrative; non-limiting). In some embodiments, evidence retrieval using an authorized evidence handle returns, instead of raw payload, one or more verification artifacts comprising at least one of: a snapshot digest, an excerpt hash, a signed access attestation, a membership/inclusion proof, a consistency/continuity proof, a redaction proof, or functionally equivalent proof objects sufficient for the reference validator to replay conformance checks under the applicable policy.

Auditor-mode offline replay with constrained disclosure (illustrative; non-limiting). In some embodiments, a conformance pack includes authorized evidence handles and a payload disclosure policy (e.g., NO_RAW_PAYLOAD_BY_DEFAULT; RAW_ONLY_IF_RE-QUIRED_BY_POLICY) such that an independent reviewer can replay validation offline using only the conformance pack plus permitted handle-based verification artifacts, and missing prerequisites deterministically yield HOLD with timestamps and reason codes.

Evidence access logging and repudiation resistance (illustrative; non-limiting). In some embodiments, access to evidence via authorized evidence handles is recorded as signed access log events or access receipts, optionally stored in a verifiable log, such that parties can verify what evidence was accessed, under what policy version digest, and whether disclosure constraints were respected.

Non-separability note (informative; non-limiting). The authorized evidence-handle and disclosure-gating embodiments are illustrative configurations of the same conformance substrate and do not describe separate inventions; they provide mechanisms for independent replay under disclosure constraints and do not limit claim scope.

In some embodiments, the system supports continuous conformance monitoring by re-validating receipts on a schedule and producing drift reports, and by issuing, expiring, or revoking a conformance badge/certification based on conformance outcomes over time.

In some embodiments, the system supports one or more receipt classes including Reasoning Receipts (claim-centric or memo-centric) and/or Forecasting Receipts (probabilistic forecasting), including proper scoring values and calibration diagnostics stored in association with receipts and conformance packs. In some embodiments, forecasting receipts, scoring values, and calibration diagnostics are evaluated under a forecasting profile of the same versioned conformance policy and are used by the same deterministic conformance and certification logic that gates downstream side effects.

Shared receipt and conformance substrate (illustrative; non-limiting). In some embodiments, the conformance layer is implemented as a shared receipt and validator service used across heterogeneous applications, such that multiple independently-developed tools and models emit receipts into a common receipt store and have their downstream side effects gated by the same reference validator and policy packs. This provides a unifying replay and conformance substrate for machine-assisted decision artifacts, rather than bespoke, non-interoperable logging or audit mechanisms attached to individual tools.

Technical effects include improved computer security and reliability by relocating deterministic validation into control paths of downstream side effects, preventing inconsistent states caused by drift, providing replayable conformance evidence, and enabling fail-closed enforcement that prevents externalized effects prior to conformance PASS.

BRIEF DESCRIPTION OF THE DRAWINGS

FIG. 4 is a flow diagram of an example method for validating a receipt under a versioned conformance policy and issuing PASS/FAIL/HOLD outcomes and deterministic reason codes.

FIG. 8 is a flow diagram for conformance pack generation and conformance badge issuance, expiration, and revocation based on continuous conformance monitoring.

FIG. 9 is a schematic of an example receipt schema (illustrative fields).

REFERENCE NUMERALS

Figure 1:
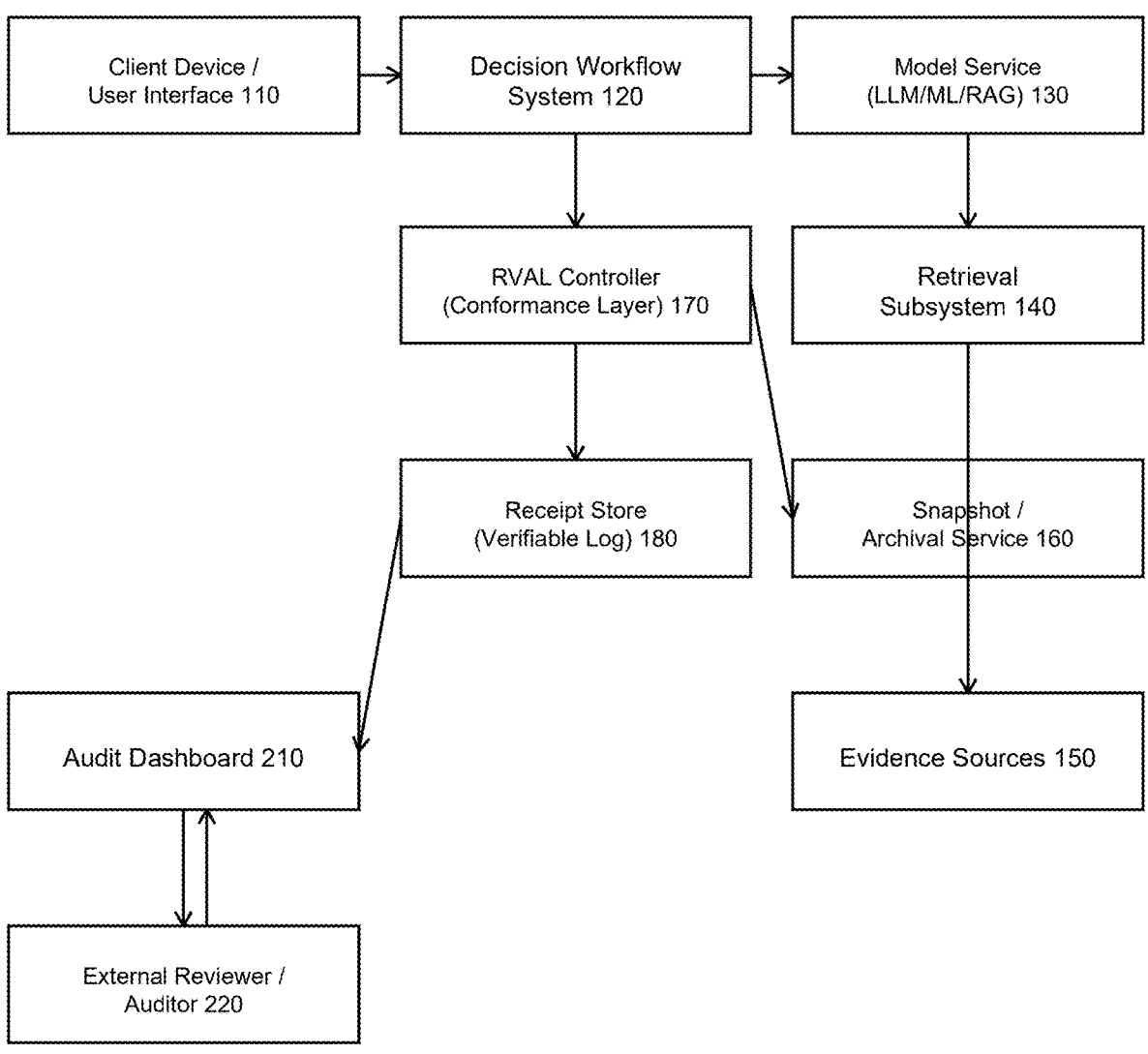
FIG. 1 is a block diagram of an example environment in which a Receipts and Validator Auditability/Conformance Layer (RVAL) governs machine-assisted decision artifacts across systems.

100 Environment
110 Client device/user interface
120 Decision workflow system
130 Model service (LLM/ML/RAG)
140 Retrieval subsystem
150 Evidence source(s)
160 Snapshot/archival service
170 RVAL controller (conformance layer)
172 Artifact intake module
174 Fact tracing module (bounded)
176 Assumption registry/declaration module
178 Receipt generator
180 Receipt store (append-only verifiable log)
181 Signed-head publisher
182 Policy/Profile manager (versioned)
183 Inclusion-proof service
184 Conformance policy store (profiles+changelog)
185 Obligation-set registry (illustrative)
186 Reason code registry
188 Reference validator
190 Fail-closed gate/HOLD router
192 Scoring harness (proper scoring, calibration)
198 Regression runner (cross-version/continuous monitoring)
200 Conformance pack generator
202 Conformance badge/certification service
204 Badge expiry/revocation manager
210 Audit dashboard
220 External reviewer/auditor
1000 Computing system

DETAILED DESCRIPTION

The following description is illustrative and non-limiting. Features described in connection with one embodiment may be combined with features of other embodiments.

A. Overview

FIG. 1 shows an environment 100 where a decision workflow system 120 uses a model service 130 and retrieval subsystem 140 to produce machine-assisted decision artifacts (assertions, memos, forecasts). An RVAL controller 170 provides a conformance layer that issues replay-verifiable receipts and deterministic validator outcomes used to gate downstream side effects.

In some embodiments, RVAL controller 170 operates as a sidecar service, gateway, library, controller, or policy-enforced middleware integrated with 120 and/or 130.

In some embodiments, the RVAL controller 170 is configured for high-stakes workflows where stakeholders require determinism, traceability, and replay-auditable conformance evidence.

B. Receipt Generation and Evidence Pinning

Figure 2:
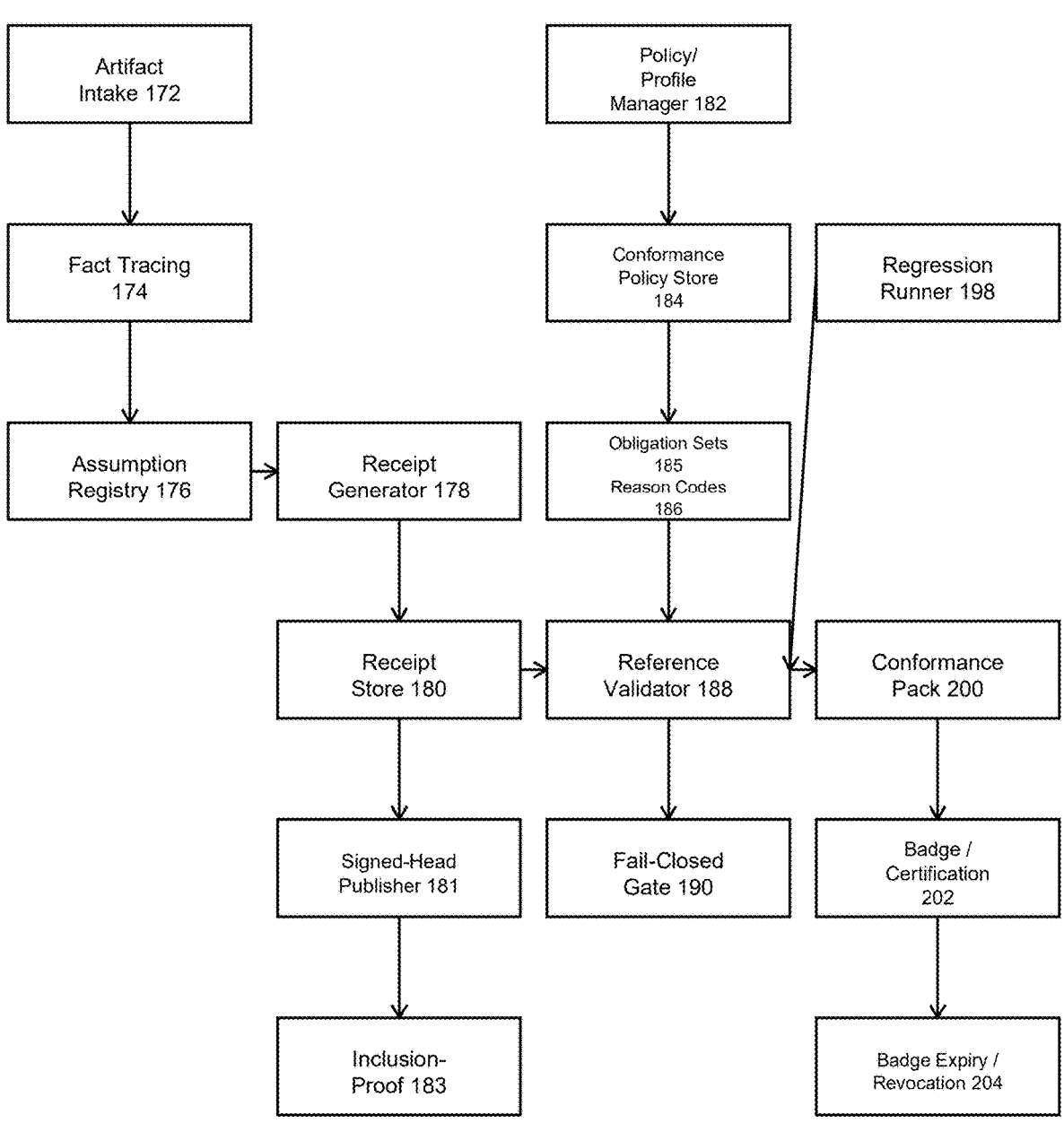
FIG. 2 is a block diagram of internal modules of an RVAL controller including receipt generation, evidence pinning/snapshotting, conformance policy/profile management, a reference validator producing deterministic reason codes, and a fail-closed gate.
Figure 3:
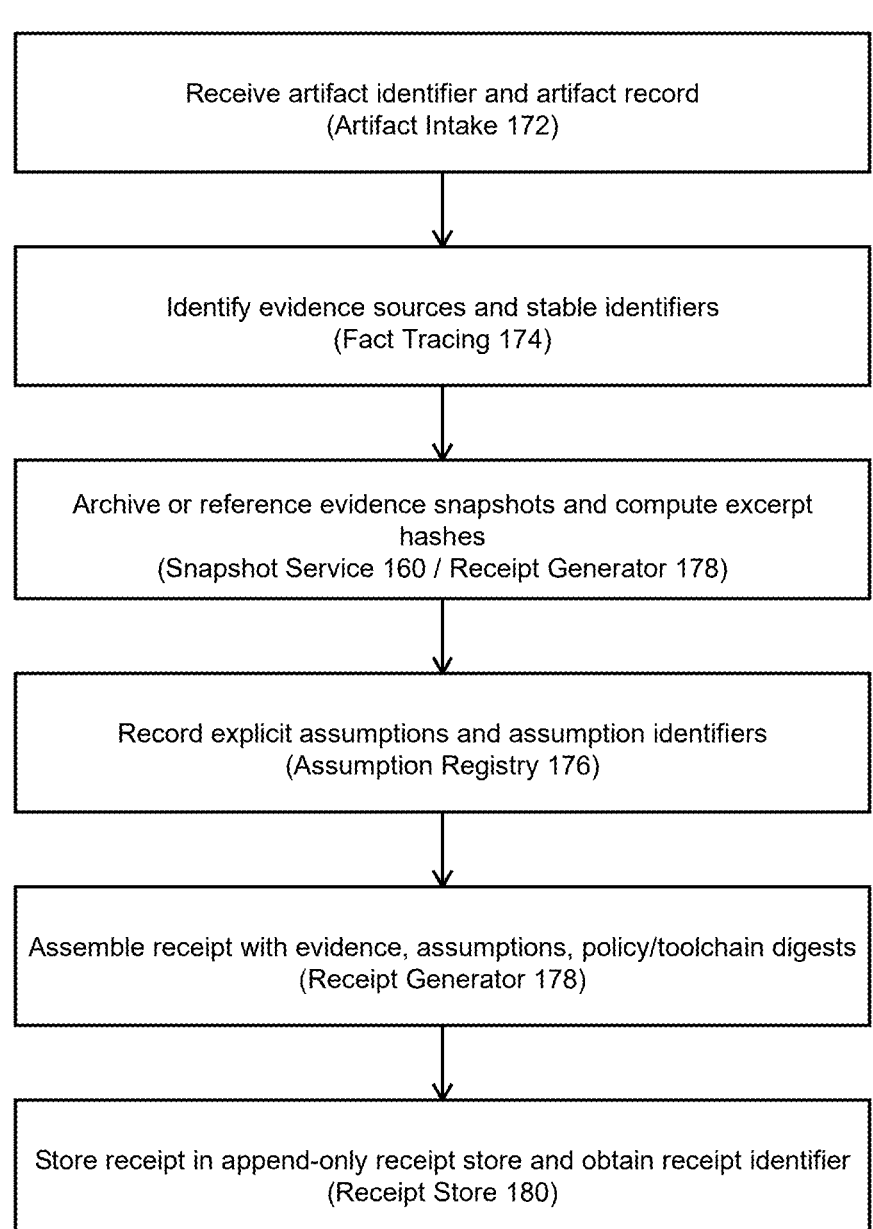
FIG. 3 is a flow diagram of an example method for generating a replay-verifiable receipt for a decision artifact and storing the receipt in a verifiable receipt store.
Figure 5:
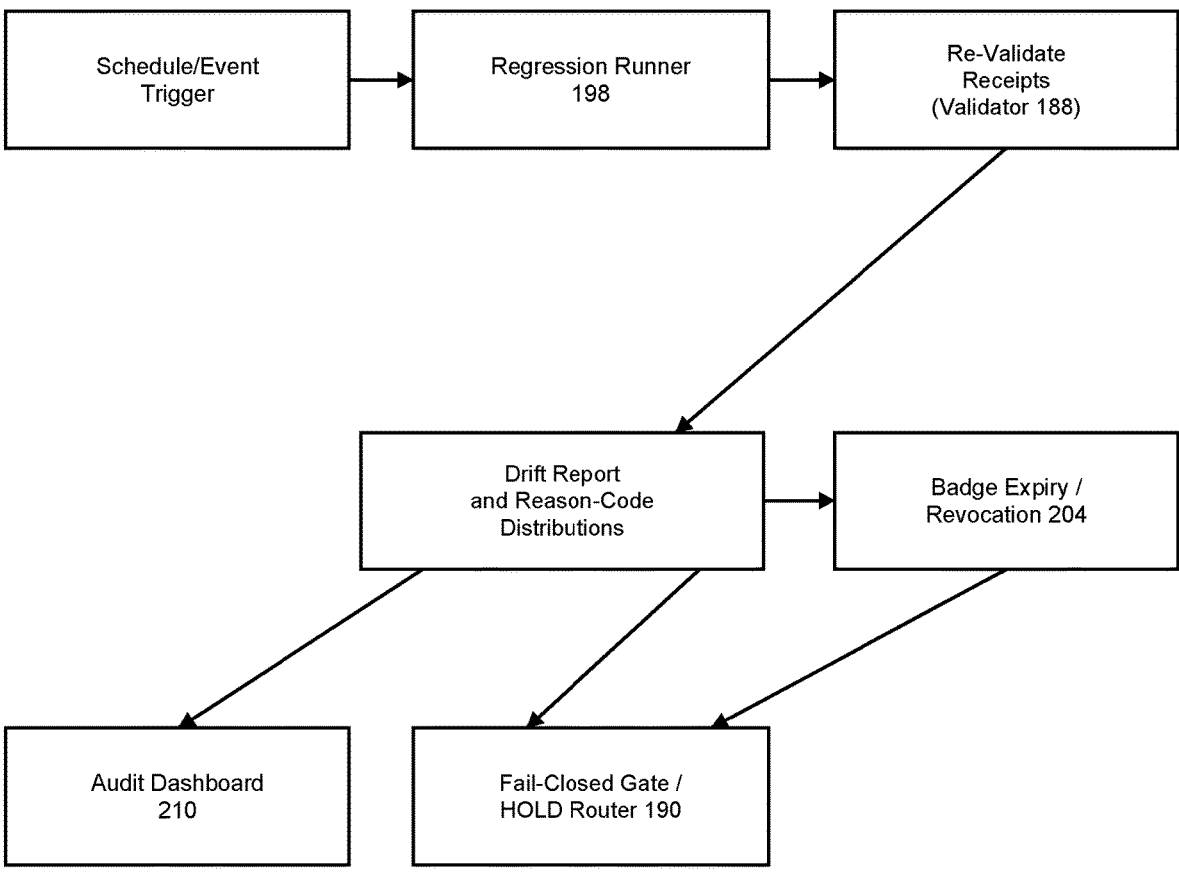
FIG. 5 is a flow diagram of continuous re-validation and drift detection using stored receipts and validator outcomes across model/tool updates and policy revisions.
Figure 6:
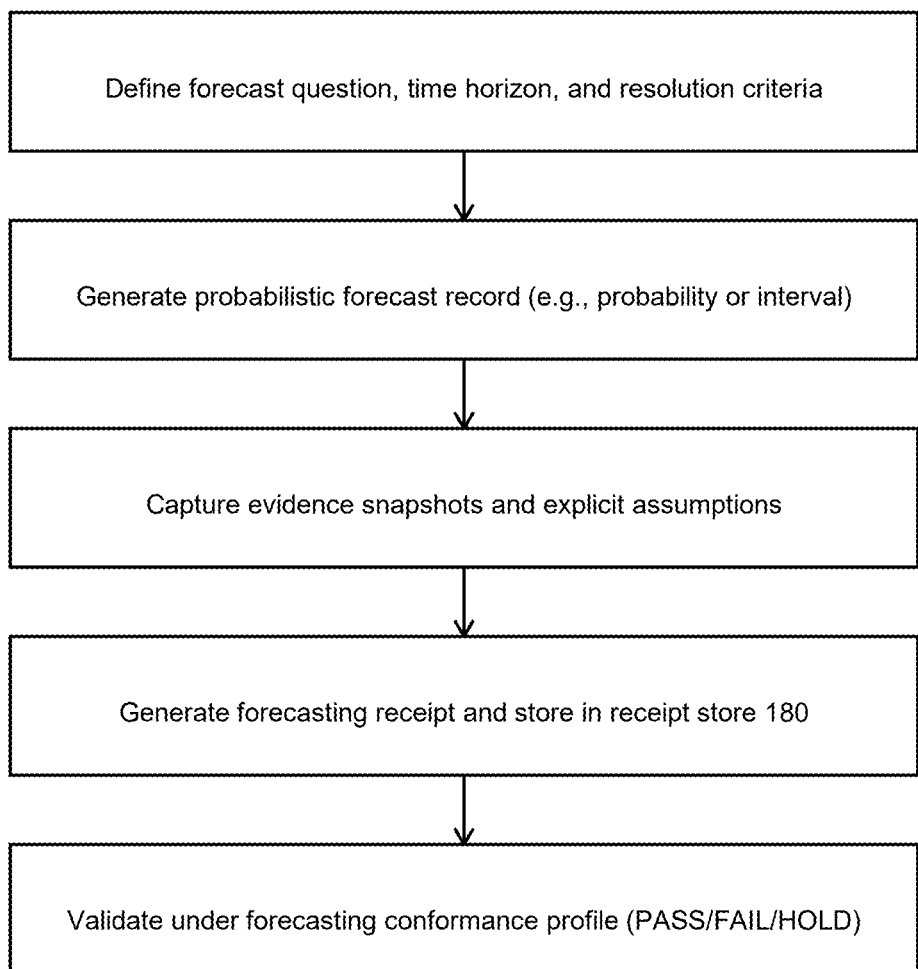
FIG. 6 is a flow diagram of an example method for generating forecasting receipts including resolution criteria and storing scoring and calibration artifacts in association with receipts.
Figure 7:
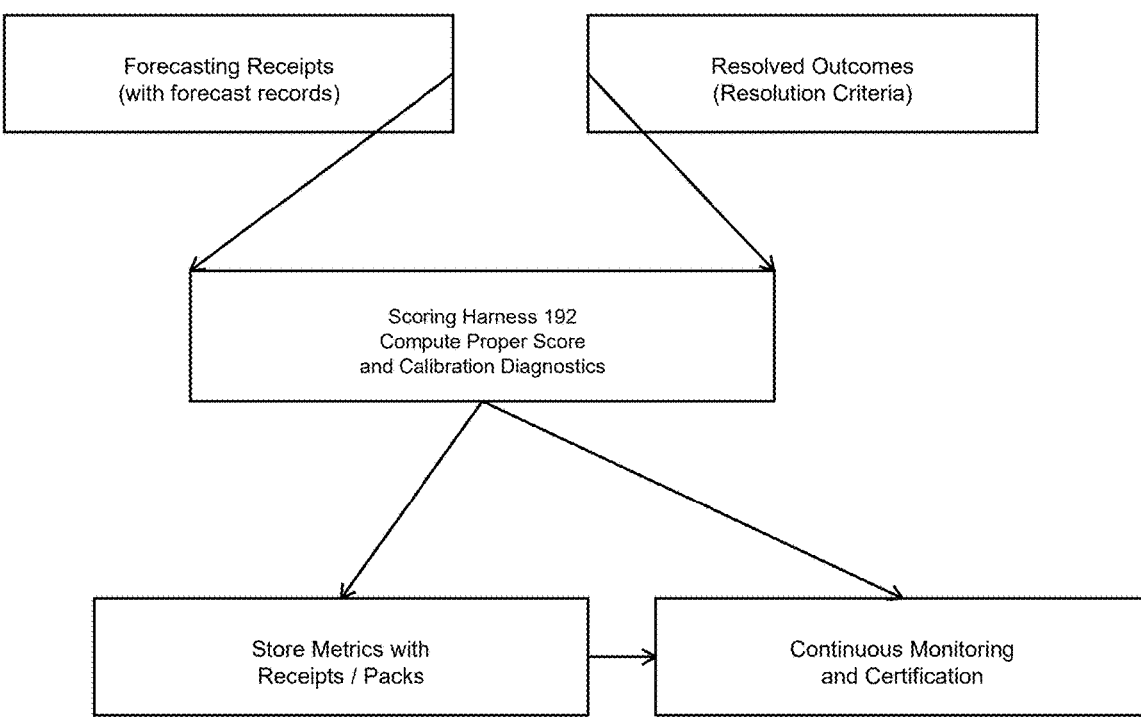
FIG. 7 is a flow diagram for computing proper scoring values and calibration diagnostics for forecast receipts and associating the results with conformance monitoring.

FIG. 2 shows RVAL controller 170 including artifact intake 172, fact tracing 174, assumption registry 176, receipt generator 178, receipt store 180, policy/profile manager 182, conformance policy store 184, reason-code registry 186, reference validator 188, and fail-closed gate 190.

In some embodiments, artifact intake 172 receives an artifact identifier, an artifact record (or pointer thereto), and optional metadata including a domain indicator (e.g., health-care_admin, consumer_health, governance, biosecurity, critical_infra), a requested conformance level, or a workflow context. In some embodiments, the validator verifies that an artifact digest committed in the receipt matches a digest computed over a defined subset of the artifact record.

Judicial/arbitration context metadata (illustrative; non-limiting). In some embodiments, when the decision artifact corresponds to a legal or arbitration proceeding, the artifact record and/or associated metadata include one or more identifiers for the proceeding, such as case identifiers, docket numbers, party identifiers, or proceeding type indicators.

In some embodiments, fact tracing 174 performs bounded, user-initiated citation following to identify evidence sources 150 and stable identifiers (e.g., DOIs, official PDFs, registry identifiers), and snapshot service 160 archives snapshots and/or records stable snapshot identifiers and excerpt hashes.

In some embodiments, assumption registry 176 records explicit assumptions and optionally assigns assumption identifiers and versions to support reuse, audit, and drift detection.

Issuer authentication checks (optional; non-limiting). In some embodiments, the reference validator verifies an issuer signature and/or message authentication code (MAC) over a canonical encoding of defined receipt fields, and emits deterministic reason codes when signature/MAC verification fails or when issuer authentication cannot be established under configured trust rules.

Trusted compute boundary for receipt issuance and/or validation (optional; non-limiting). In some embodiments, at least one of receipt generation, signature/MAC computation, policy-pack verification, or deterministic validation is performed within a remotely attestable trusted compute boundary comprising at least one of a trusted execution environment (TEE), a hardware security module (HSM), or a verifiably deterministic audited sandbox, and the receipt and/or conformance pack includes a boundary measurement or attestation identifier usable to detect substitution of the trusted compute boundary.

C. Verifiable Receipt Store: Signed Heads and Inclusion Proofs

In some embodiments, receipt generator 178 stores receipts in an append-only receipt store 180.

In some embodiments, the receipt store 180 publishes one or more signed heads via signed-head publisher 181, and inclusion-proof service 183 generates proofs that a given receipt is included under a given signed head, optionally subject to a freshness policy.

In some embodiments, the signed heads and inclusion proofs enable independent parties to verify receipt immutability, ordering, and inclusion without trusting the receipt store operator.

Anti-equivocation/witness (optional; non-limiting). In some embodiments, the receipt store publishes heads to one or more witnesses or monitors, supports gossip or consistency proofs, and/or detects equivocation or rollback attempts, emitting corresponding reason codes and enforcing HOLD. In some embodiments, monitors verify consistency proofs across successive heads and enforce HOLD upon inconsistency.

D. Deterministic Validator, Conformance Policy Packs, and Reason Codes

In some embodiments, reference validator 188 checks receipt structure, integrity metadata, completeness, and replayability under a versioned conformance policy stored in 184, selected by policy/profile manager 182 based on workflow context.

In some embodiments, the conformance policy is represented as a policy pack having at least a policy pack identifier and a policy version digest, and, when required, changelog entries and/or a changelog pointer sufficient to support deterministic conformance evaluation and explainable, machine-readable outcomes.

In some embodiments, reference validator 188 emits deterministic PASS/FAIL/HOLD with deterministic reason-code identifiers associated with reason-code registry 186 (e.g., SOURCE_UNRETRIEVABLE, SNAPSHOT_MISSING, MISSING_ASSUMPTIONS, MISSING_RESOLUTION_CRITERIA, ASSUMPTION_DRIFT, POLICY_ID_STALE, INFERENCE_GAP, FORMAT_INVALID).

In some embodiments, HOLD indicates fail-closed routing: downstream side effects are withheld, a human review is requested, and/or a remediation workflow is invoked.

Supported-versus-inferred separation (optional; non-limiting). In some embodiments, the conformance policy requires that at least a defined subset of statements or fields in the decision artifact be labeled as supported or inferred.

Supported labeling rule (optional). In some embodiments, a supported statement is required to reference at least one evidence identifier and/or excerpt locator and excerpt hash committed in the receipt, and the validator emits INFERENCE_GAP or REQUIRED_FIELD_MISSING when the mapping cannot be established.

Inferred labeling rule (optional). In some embodiments, an inferred statement is required to reference at least one assumption identifier and/or assumption declaration committed in the receipt, and the validator emits MISSING_ASSUMPTIONS or INFERENCE_GAP when the assumption binding is absent.

Domain-specific evaluation rubrics (illustrative; non-limiting). In some embodiments, the conformance policy references one or more domain-specific evaluation rubrics authored by subject-matter experts. Rubrics may define machine-checkable predicates and thresholds for quality, safety, or escalation requirements.

Rubric-score pinning in receipts (illustrative; non-limiting). In some embodiments, the receipt and/or conformance pack commits to rubric identifiers and rubric evaluation outputs, including at least a rubric_id, a rubric_version (or rubric_version_digest), and at least one of a rubric_score or rubric pass_indicator, and the reference validator emits non-PASS outcomes and deterministic reason codes when required rubric predicates or thresholds are not satisfied under the applicable policy version digest.

Non-limiting note for rubric embodiments. Rubric-based evaluation is an example of domain-specific conformance predicates evaluated over the same receipt, policy-pack, and toolchain identifiers and does not limit the claims to any particular rubric structure, scoring scale, or domain.

Conformance suite structure (illustrative; non-limiting). In some embodiments, a conformance suite includes (i) a suite identifier, (ii) a suite digest computed over a canonical encoding of suite contents, (iii) a suite schema identifier and schema digest, (iv) one or more test-vector identifiers, and (v) expected validator outputs comprising expected outcomes and expected reason-code identifiers under a specified policy version digest and reason-code registry digest. In some embodiments, the expected validator outputs, together with the specified policy version digest and reason-code registry digest, define a deterministic evaluation contract (also referred to herein as an output contract) for a deterministic mapping from verification conditions to the outcome and deterministic reason-code identifiers.

Test vector execution against IUT (illustrative; non-limiting). In some embodiments, a test-vector runner invokes the IUT as a local library, remote service, gateway, sidecar, or embedded module, and provides test-vector inputs that include at least a receipt (or receipt fields subset), a policy pack identifier and a policy version digest, and optional modeled-variability parameters, receiving in response deterministic test-vector outputs each comprising an outcome selected from PASS, FAIL, or HOLD and one or more deterministic reason-code identifiers associated with a reason-code registry.

Output comparison and mismatch reporting (illustrative; non-limiting). In some embodiments, the system compares received test-vector outputs to expected validator outputs for each test vector and produces a mismatch report identifying at least one of an outcome mismatch, a deterministic reason-code identifier mismatch, a schema digest mismatch, a canonicalization mismatch, or a validator digest mismatch.

Certification issuance (illustrative; non-limiting). In some embodiments, when the IUT satisfies the expected validator outputs for at least a defined subset of the suite, the system issues a digitally signed conformance certificate, the digital signature being computed over a canonical encoding of at least certificate fields committing to the suite digest, policy version digest, and validator digest, and an effective coverage declaration (e.g., receipt classes, action classes, control-point classes, and optional conformance levels).

Certificate validity lifecycle (illustrative; non-limiting). In some embodiments, certificate validity is governed by at least one of an expiry time, a revocation reference, a required revalidation cadence, or a regression-trigger rule that triggers re-testing upon at least one of a policy-pack update, reason-code registry update, validator update, or canonicalization update.

Certificate publication and verification (illustrative; non-limiting). In some embodiments, certificates and revocation records are published to a certificate registry that provides signed heads or functionally equivalent integrity-protected checkpoints and supports inclusion proofs and, optionally, anti-equivocation monitoring, enabling independent verification of certificate status. In some embodiments, publication evidence includes at least a certificate digest and at least one of a signed-head identifier or a checkpoint identifier and, when required, an inclusion proof, usable for independent verification of publication.

Certification-conditioned gating (illustrative; non-limiting). In some embodiments, a fail-closed gate releases a downstream side effect only when both (i) the artifact-level conformance outcome is PASS under the applicable policy version digest and (ii) the validator used is covered by a non-revoked certificate verifiable relative to a certificate-registry signed head or integrity-protected checkpoint satisfying a freshness policy (recency bound); otherwise the gate deterministically holds with reason codes.

Non-limiting note. The certification and registry embodiments are optional and may be omitted; functionally equivalent certification mechanisms and registry structures are intended to be covered unless expressly limited by the claims.

E. Fail-Closed Routing and Side-Effect Gating

In some embodiments, fail-closed gate 190 prevents externalized effects until conformance PASS occurs, including publishing or transmitting, committing into a record system, auto-finalization, auto-adjudication, or automated execution based on the decision artifact.

Legal and arbitration record systems (illustrative; non-limiting). In some embodiments, committing into a record system includes committing an adjudication record into a case-management or docket system, or posting an award, order, or judgment into an electronic dispute-resolution platform.

In some embodiments, fail-closed gate 190 may return a structured denial response or HOLD response including deterministic reason codes, remediation hints, and/or a pointer to the receipt or conformance pack for audit.

Integration points (illustrative; non-limiting). In some embodiments, the fail-closed gate is implemented as an API gateway check, message-queue interceptor, database transaction hook, record-finalization hook, workflow-state transition guard, UI finalization gate, or comparable control-path mechanism.

Two-phase/commit-style gating (optional). In some embodiments, the gate enforces a two-phase pattern in which a side-effect request is staged but not committed until PASS, and a commit token (or functional equivalent) is issued only upon PASS.

Gating evidence record (optional). In some embodiments, the gate produces a gating decision record (e.g., gate_decision_id, gated_side_effect_type, target_system_id, commit_id/transaction_id, timestamps) that is bound into the conformance pack to support independent verification of enforcement.

Idempotent and atomic enforcement across retries (optional; non-limiting). In some embodiments, the gate enforces idempotency by binding an idempotency key to at least a receipt digest (or artifact digest) and a target side-effect identifier, and ensures that token issuance and side-effect release are atomic with PASS, such that retries cannot externalize effects in non-PASS states or create inconsistent intermediate states.

F. Continuous Conformance Monitoring and Drift Detection

In some embodiments, regression runner 198 periodically re-validates stored receipts under pinned identifiers across model updates, retrieval updates, validator updates, and/or policy revisions.

In some embodiments, regression runner 198 produces drift reports comprising changes in conformance results, changes in reason code distributions, and/or changes in replay outcomes under updated toolchains or policies.

Multi-tenant monitoring (illustrative; non-limiting). In some embodiments, continuous conformance monitoring is performed in a multi-tenant fashion for receipts emitted by multiple tools, models, or vendors, such that a central conformance rail can detect drift, replay failures, or policy incompatibilities across heterogeneous machine-assisted workflows while applying shared badge rules and side-effect gating requirements.

In some embodiments, continuous conformance monitoring is used to support post-deployment assurance programs and to trigger hold routing, remediation, and/or certification badge changes.

G. Forecasting Receipts, Scoring, and Calibration

In some embodiments, a forecasting receipt includes resolution criteria, time horizon, forecast type, probability distribution or interval, assumptions, evidence snapshots, toolchain identifiers, and scoring configuration digests.

In some embodiments, scoring harness 192 computes proper scoring values and calibration diagnostics, and stores outputs in association with receipts and/or conformance monitoring records.

In some embodiments, forecasting receipts are validated under a forecasting conformance profile requiring at least explicit resolution criteria and sufficient pinning for replay.

H. Conformance Pack and Certification Badge Issuance

In some embodiments, conformance pack generator 200 produces a portable conformance pack comprising the receipt, policy identifiers and digests, validator identifiers, reason codes, and verifiable receipt-store evidence (e.g., signed head and inclusion proof) sufficient for independent replay of conformance checks.

H1. Authorized Evidence Handles and Disclosure-Gated Replay (Illustrative; Non-Limiting).

In some embodiments, conformance pack generator 200 issues one or more authorized evidence handles scoped to an auditor-mode and bound to at least one of a receipt digest, a conformance pack digest, and a policy version digest, such that use outside scope or substitution is deterministically detectable under configured checks.

In some embodiments, redemption of an authorized evidence handle returns verification artifacts without disclosing raw restricted payloads by default unless required by an applicable policy, including at least one of snapshot digests, excerpt hashes, signed access attestations, signed heads, inclusion proofs, continuity proofs, redaction proofs, zero-knowledge proofs, or functionally equivalent proof objects sufficient for replay validation.

In some embodiments, access to evidence via authorized evidence handles is recorded as signed access receipts or signed access log events, optionally stored in a verifiable log, to provide repudiation resistance and to support later dispute, appeal, or oversight review of what evidence was accessed and under what policy version digest.

Example schemas and data structures for authorized evidence handles and disclosure policies are provided in Appendix L (illustrative; non-limiting), and are not intended to limit claim scope; the claims control.

In some embodiments, conformance badge/certification service 202 issues a badge identifier for PASS, where the badge commits to at least a receipt identifier, a policy version digest, and a verifiable receipt-store head identifier.

In some embodiments, badge expiry/revocation manager 204 expires or revokes a badge when continuous conformance monitoring identifies drift, policy incompatibility, replay failures, or other conditions defined by the conformance policy.

Approval/release receipts (illustrative; non-limiting). In some embodiments, after PASS (or after policy-defined conditions for release are satisfied), the system generates an approval receipt that is bound to the conformance pack (or conformance result digest) and to a gating decision record, and stores the approval receipt in a verifiable store, thereby enabling an independent reviewer to verify that the side effect was released only after admissibility.

Revocation/supersession receipts (illustrative; non-limiting). In some embodiments, the system generates a revocation or supersession receipt that binds to a previously issued approval receipt, badge, certificate, or conformance statement, and records an effective time and reason code so that relying parties can deterministically treat the prior assertion as no longer valid under the applicable policy version digest.

Non-limiting note. Approval/release and revocation/supersession receipts may be omitted in some deployments; functionally equivalent mechanisms for auditable release and withdrawal are intended to be covered unless expressly limited by the claims.

Reliance boundary placement (illustrative; non-limiting). In some embodiments, a reliance boundary is implemented as an API gateway check, workflow-state transition guard, transaction commit hook, record-finalization hook, message-queue interceptor, UI finalization gate, or other functionally equivalent control-path mechanism that determines whether an operation may proceed based on reliance admissibility.

Reliance admissibility predicates (illustrative; non-limiting). In some embodiments, reliance admissibility includes verifying that a relied-upon approval receipt or other asserted conformance artifact is not REVOKED, not SUPERSEDED, and within applicable time, scope, tenant, and jurisdiction bounds under an applicable policy version digest, and producing a deterministic reliance outcome and reason codes when admissibility is not established.

Verifiable publication for revocation/supersession status (optional; non-limiting). In some embodiments, approval/release receipts and revocation/supersession receipts are stored in the same receipt store 180 or in a logically separate assertion-lifecycle registry that publishes signed heads and supports inclusion/consistency proofs, and reliance admissibility checks use signed-head freshness and, when required, inclusion/consistency evidence to prevent stale reliance.

Anti-equivocation for reliance status (optional; non-limiting). In some embodiments, signed heads used for reliance admissibility are monitored using at least one of a witness, a monitor, gossip, or consistency proofs, and reliance is deterministically held upon detection of inconsistency, rollback, or equivocation.

Invalidation propagation and caching (optional; non-limiting). In some embodiments, the system propagates invalidation state (e.g., epoch/counter/version vector) to reliance boundaries and requires acknowledgment or a bounded remediation path when a reliance boundary cannot confirm adoption, thereby preventing cache-stale reliance.

Break-glass override (optional; non-limiting). In some embodiments, a policy-authorized break-glass mechanism permits a time-bounded override of a non-ALLOW reliance outcome and emits an override receipt committing to at least an override authority, scope, expiry, and reason code, enabling later independent review.

Appeal and supersession workflows (optional; non-limiting). In some embodiments, dispute, appeal, or correction workflows generate appeal receipts and supersession receipts that bind predecessor and successor objects (by identifiers/digests) to support chain integrity and to deterministically determine which assertion is current for reliance under the applicable policy version digest.

I. Obligation Sets and Domain Profiles (Illustrative)

In some embodiments, the conformance policy store 184 includes domain profiles and/or obligation sets in registry 185 that define minimal conformance requirements for regulated or high-stakes domains, including healthcare administration, governance, biosecurity, critical infrastructure, and forecasting.

In some embodiments, an obligation set defines machine-checkable requirements such as: required pinned identifiers, snapshot requirements, retention requirements, required reason-code emission, re-validation schedule requirements, and requirements for gating specified side effects.

In some embodiments, obligation sets enable the same technical conformance engine to be configured for domain-specific compliance and audit needs without changing core architecture.

J. Technical Effect and Computer Implementation

RVAL controller 170 improves computer system reliability and security by relocating deterministic conformance checks into control paths that gate downstream side effects and by preventing inconsistent states in which non-replayable artifacts cause externalized effects. In some embodiments, these improvements are realized through concrete changes to computer operation, including enforcing receipt-anchored gating decisions within control paths (e.g., transactional or commit-style control paths), structuring data as verifiable log entries with signed heads and inclusion proofs, and driving machine-enforced side-effect decisions from deterministic policy-pack evaluation rather than ad hoc, post-hoc, or purely manual review.

Figure 10:
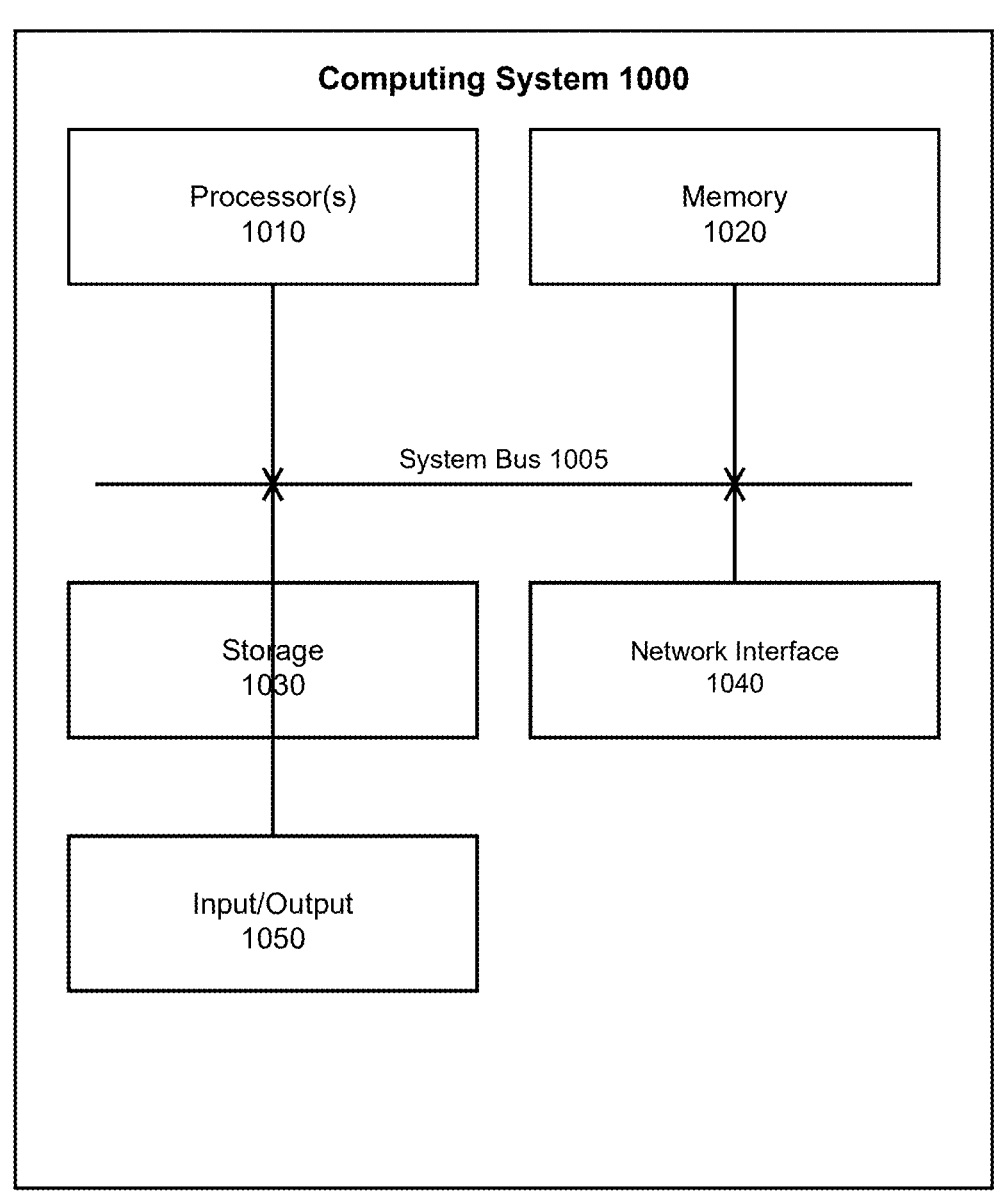
FIG. 10 is a block diagram of an example computing system.

FIG. 10 illustrates computing system 1000 comprising processors, memory, storage, and network interfaces executing the disclosed modules.

Non-mental, computer-implemented improvements (illustrative; non-limiting). The disclosed systems are not merely mental steps, paper checklists, or generic post-hoc auditing. They rely on machine-enforced gating of side-effecting operations, cryptographic or functionally equivalent digests, verifiable log structures, and deterministic evaluation of policy packs that operate at machine timescales within control paths of software systems. Humans cannot practically perform the same replay validation, state-consistency enforcement, or side-effect gating at comparable scale or latency without the disclosed computer-implemented mechanisms.

The disclosed techniques may be embodied in, or implemented as, one or more of: (i) a computer-implemented method performed by one or more processors; (ii) a system comprising one or more processors and one or more non-transitory computer-readable storage media storing instructions that, when executed by the one or more processors, cause the one or more processors to perform the operations described herein; and (iii) one or more non-transitory computer-readable storage media storing instructions that, when executed by one or more processors, cause the one or more processors to perform any of the methods described herein.

APPENDICES

Appendices (illustrative; non-limiting; evidentiary examples). Appendices A-L form part of this Specification and provide, by way of example and not limitation, (i) glossary entries for definitional clarity; (ii) example data structures, schemas, and canonical encodings for Receipts, Conformance Statements, Conformance Packs (including RTES Evidence Packs), and signed Conformance Results; (iii) example registries including reason-code registries, obligation-set registries, profile/level entry-criteria definitions, and validator-implementation certification artifacts; (iv) example policy packs and profile packs including identifiers, versioning, effective-date ranges, cutover indicators, changelog pointers, and cryptographic commitments to policy/profile packs and control mappings; (v) example verifiable-log evidence, proof objects, and predicates for signed-head verification, freshness, inclusion, and append-only evolution consistency, including anti-equivocation variants; (vi) example integration modes and deployment profiles for fail-closed side-effect gating (including minimum must-pass sets, no-dead-end predicates, and multi-log verification variants); (vii) example procurement-ready outputs including conformance summaries and control mappings (e.g., ACR/VPAT-style summaries); (viii) example independent-verifier artifacts including auditor-mode offline verification fields, authorized evidence-handle patterns, omission-risk indicators, and delegation/assisted-completion and abuse-risk evidence patterns; (ix) example conformance-suite packages comprising deterministic test vectors and expected validator outputs, including suite identifiers, suite digests, canonical encodings, and mismatch-report schemas; (x) example conformance-certificate and certificate-registry schemas including certificate validity and revocation artifacts and optional signed-head/inclusion-proof evidence; and (xi) example authorized-evidence-handle and payload-disclosure-policy schemas for proof-bearing replay verification without raw restricted payloads by default, including scope constraints, audience constraints, permitted-operations constraints, and access-receipt logging variants. These materials aid enablement and implementation and are illustrative and non-limiting; nothing in the appendices is intended to limit claim scope, and the claims control. In the event of any inconsistency between an appendix and the body of this Specification, the body controls.

Appendix A—Glossary

A0. Interpretive note (non-limiting). As used herein, terms are construed broadly to cover functionally equivalent implementations unless expressly limited by the claims. "In some embodiments" and "optionally" denote non-limiting examples.

A1. Decision Artifact: any output used, referenced, or relied upon in a workflow decision, including a claim, memo, recommendation, forecast, rationale digest, decision record, adjudication record, or comparable structured output, whether stored inline or by pointer, and whether produced wholly by computational models, by human-in-the-loop workflows, or any combination thereof.

A2. Artifact Identifier: an identifier associated with a decision artifact, including a UUID, content address, database key, log index, or other identifier sufficient to reference the artifact.

A3. Artifact Record: a representation of a decision artifact, including the artifact itself, a structured subset, a digest, and/or a pointer with sufficient metadata to retrieve or verify the artifact.

A4. Commit/Commitment: binding, associating, or otherwise cryptographically or integrity-preservingly linking a value (e.g., digest, identifier, snapshot reference) to another object (e.g., receipt, conformance pack, badge) such that substitution or tampering is detectable under configured checks.

A5. Receipt: a structured artifact that (i) identifies and/or commits to one or more evidence items, assumptions, policies, toolchain identifiers/configuration digests, and optionally human review steps or approvals, and (ii) is usable for replay validation of conformance under a versioned conformance policy.

A6. Receipt Digest: an integrity value (e.g., cryptographic hash or functionally equivalent digest) computed over at least a defined subset of receipt fields such that tampering is detectable.

A7. Receipt Schema Identifier: an identifier that names a receipt schema, including a schema URI, version string, or profile identifier.

A8. Schema Digest: an integrity value computed over a schema definition or schema pack such that schema substitution is detectable.

A9. Evidence: any information item used to support, justify, or contextualize a decision artifact, including documents, datasets, logs, policies, regulations, transcripts, structured records, or comparable sources.

A10. Evidence Identifier: a stable identifier for evidence, including a DOI, publication identifier, repository commit ID, database record key, content address, or other identifier usable to retrieve and/or verify evidence.

A11. Snapshot/Archived Evidence Snapshot: a preserved, time-bound representation of evidence (or a verifiable reference thereto) intended to reduce drift or link rot, including a stored copy, content-addressed blob, notarized reference, or other archival representation.

A12. Snapshot Identifier: an identifier for a snapshot, including a content address, archive URI, or storage key.

A13. Excerpt: a bounded portion of evidence (e.g., paragraph, table row, code block) selected for support.

A14. Excerpt Hash: an integrity value computed over an excerpt (or normalized excerpt form) such that excerpt substitution is detectable.

A15. Assumption Declaration: an explicit statement of an assumption used in generating or evaluating a decision artifact, including boundary conditions, unknowns, priors, constraints, or simplifications.

A16. Assumption Identifier: an identifier for an assumption declaration, enabling reuse, versioning, or drift detection for that assumption.

A17. Toolchain Identifier: an identifier for a tool, model, retriever, validator, scoring harness, runtime, or configuration component used to generate or validate a decision artifact.

A18. Configuration Digest: an integrity value computed over configuration inputs (e.g., prompts, retrieval settings, validator ruleset, scoring parameters) such that configuration substitution is detectable.

A19. Conformance Policy: versioned, machine-checkable rules defining minimum conformance requirements for (i) replay validation of receipts and (ii) gating of downstream side effects.

A20. Policy Pack/Conformance Policy Pack: a portable representation of a conformance policy including at least (i) a policy pack identifier (also referred to herein as a policy identifier or policy_id), (ii) a policy version digest, and (iii) sufficient content or pointers to enable deterministic evaluation under that policy.

A21. Domain Profile: a policy-selectable profile that tailors conformance policy requirements to a workflow context or domain class (e.g., healthcare administration, governance), without changing the core conformance engine.

A22. Obligation Set: a named set of machine-checkable requirements referenced by a conformance policy and/or domain profile, including required fields, required pin types, minimum replay checks, revalidation schedule, and/or badge rules.

A23. Reference Validator: a validator that, given a receipt and a conformance policy pack, performs deterministic conformance checks and emits a deterministic conformance result and one or more deterministic reason-code identifiers associated with a reason-code registry.

A24. Deterministic: producing the same output for the same inputs under the same policy pack and verification context, except for explicitly modeled variability (e.g., time-based freshness windows or external availability checks) that is itself recorded or reason-coded.

A25. PASS/FAIL/HOLD: deterministic conformance outcomes, wherein PASS indicates conformance under the selected policy, FAIL indicates nonconformance, and HOLD indicates fail-closed routing when conformance cannot be established or is blocked by missing/invalid prerequisites.

A26. Reason Code: a deterministic machine-readable code identifying a specific conformance failure mode or hold condition, optionally accompanied by structured metadata.

A27. Fail-Closed Routing: enforcement logic that withholds or gates downstream side effects until conformance PASS occurs or a remediation workflow completes.

A28. Downstream Side Effect: any externalized effect based on a decision artifact, including publishing, transmitting, committing, auto-finalizing, auto-adjudicating, executing an action, or changing a state outside the conformance boundary.

A29. Conformance Pack: a portable package including at least (i) a receipt (or receipt digest), (ii) a policy pack identifier and policy version digest, (iii) validator identifiers/digests and emitted reason codes, and (iv) verifiable receipt-store evidence sufficient for independent replay validation.

A29A. RTES Evidence Pack: a conformance-pack variant packaged for independent replay review, comprising at least the receipt (or receipt digest), conformance statement (or digest), policy identifiers/digests, validator identifiers/digests, deterministic reason codes, and verifiable receipt-store evidence sufficient for independent replay.

A30. Receipt Store (Append-Only Verifiable Log): a store that records receipts and supports detection of mutation, reordering, or deletion by use of an append-only structure and/or verifiable log techniques.

A31. Signed Head: a published value (e.g., log head digest) digitally signed or otherwise integrity-protected, usable to verify log state under configured checks.

A32. Inclusion Proof: proof data (e.g., Merkle proof or functional equivalent) sufficient to verify that a receipt is included under a signed head.

A33. Freshness Policy: a rule that constrains how recent a signed head (or other checkpoint) must be for a validation decision to be accepted.

A34. Replay/Replay Validation: re-executing conformance checks using pinned identifiers and integrity evidence to determine whether a receipt conforms under a policy pack; replay does not assert ground-truth correctness unless expressly claimed. Replay validation establishes conformance to pinned auditability requirements and does not, by itself, guarantee semantic correctness unless expressly claimed.

A35. Continuous Conformance Monitoring: periodic or event-triggered re-validation of stored receipts to detect drift, replay failures, or policy incompatibility and to maintain or update certification state.

A36. Drift: a detectable change in conformance outcomes, replay outcomes, reason-code distributions, or verification artifacts across time, updates, or policy revisions.

A37. Drift Report: a report of drift including changed outcomes and/or reason-code distributions and optionally identifying triggering updates.

A38. Remediation Workflow: a workflow invoked on FAIL or HOLD that may request missing evidence, re-pin snapshots, update assumptions, update policy selection, or require human review.

A39. Conformance Badge/Certification Identifier: an identifier issued for PASS that commits to at least a receipt identifier (or digest) and a policy version digest and that is subject to expiry or revocation under badge rules.

A40. Expiry/Revocation: change of badge state that invalidates or suspends a badge based on continuous monitoring outcomes or policy-defined conditions.

A41. Conformance Boundary: the boundary defining which components, identifiers, and checks are within the deterministic evaluation contract for a given policy pack.

A42. Canonicalization Function: a normalization procedure applied to receipt/policy fields prior to digesting to ensure stable deterministic inputs.

A43. Validator Digest: an integrity value computed over validator logic/ruleset such that validator substitution is detectable.

A44. Gating Decision Record/Enforcement Evidence: evidence bound to a pack indicating a side-effect was prevented prior to PASS and, optionally, identifying the gated operation.

A45. Receipt Store functional equivalents (illustrative; non-limiting).

A receipt store may be implemented using an append-only log, ledger, transparency log, WORM storage, a database with verifiable checkpoints, or other functionally equivalent structures that support detection of mutation, deletion, or reordering under configured verification checks.

A46. Signed Head functional equivalents (illustrative; non-limiting).

A signed head may be integrity-protected by a digital signature, MAC, hardware security module (HSM) protection, trusted execution environment (TEE) attestation, or other functionally equivalent integrity mechanism, and may include a head digest, timestamp, and key/attester identifier.

A47. Inclusion Proof functional equivalents (illustrative; non-limiting).

An inclusion proof may comprise a Merkle proof, membership witness, accumulator proof, consistency proof, or other functionally equivalent proof data sufficient to verify that a referenced receipt is included under a referenced head or checkpoint.

A48. Freshness Policy functional equivalents (illustrative; non-limiting).

A freshness policy may be defined relative to time, sequence numbers, maximum merge delay, checkpoint cadence, or other functionally equivalent constraints that bound how recent a head or checkpoint must be for acceptance of a conformance determination.

A49. Downstream Side Effect functional equivalents (illustrative; non-limiting).

A downstream side effect may include any externally visible write, commit, transmission, execution, actuation, or state change mediated by software or hardware, including but not limited to: database commits, message-queue enqueues, record-finalization events, payment or adjudication postings, configuration changes, model deployments, or robot/actuator commands.

Functionally equivalent mechanisms that externalize the effect of a decision artifact are treated as downstream side effects.

A50. Side-Effect Gate functional equivalents (illustrative; non-limiting).

A gate that enforces fail-closed routing may be implemented as, for example, an API gateway check, message-queue interceptor, database transaction hook, record-finalization hook, workflow-state transition guard, UI finalization gate, commit-token service, or functionally equivalent control-path mechanism that can deny, delay, or require explicit release of a downstream side effect.

A51. Control Path (illustrative; non-limiting).

A control path refers to the set of checks or mechanisms that determine whether a downstream side effect is permitted to occur, including paths that issue or withhold commit tokens, schedule or cancel side-effecting operations, or otherwise decide whether an externalized effect will be executed.

A52. HOLD Routing functional equivalents (illustrative; non-limiting).

HOLD routing may include queuing, degrading, postponing, or substituting downstream side effects, including routing to a human review queue, emitting a structured denial or HOLD response, applying rate-limits or safety fallbacks, or functionally equivalent mechanisms that prevent unvetted side effects from executing while preserving opportunity for remediation or later PASS.

A53. External Reviewer/Oversight Body (illustrative; non-limiting).

As used herein, an external reviewer may include, for example, an oversight body, regulator, accreditation body, arbitration administrator, or appellate court or tribunal that independently reviews or verifies conformance evidence, conformance packs, or adjudication receipts for high-stakes workflows, including judicial or arbitration workflows.

A54. Conformance Statement: a structured, declarative object included in or referenced by a conformance pack that specifies, in machine-readable and/or human-readable form, the claimed conformance level, declared action class, declared scope-of-use, covered receipt types, covered control points, freshness assumptions, retention window, and out-of-scope exclusions, such that an independent reviewer can interpret what conformance claims are asserted and what is excluded, without expanding or narrowing claim scope beyond the claims.

A55. Auditor-Mode: a verification mode in which an independent reviewer replays conformance validation using a conformance pack and authorized evidence handles, optionally offline, without requiring privileged access to internal systems unless explicitly required by policy, wherein missing prerequisites deterministically yield HOLD with deterministic reason codes.

A56. Evidence Handle/Authorized Evidence Handle: a reference, token, capability, locator, or other handle that enables retrieval and/or verification of evidence or a snapshot under configured access rules, without necessarily disclosing raw restricted payloads, and that can be included in a receipt or conformance pack to support replay validation.

A57. Restricted Payload/Raw Restricted Payload: raw content or raw data subject to disclosure constraints, including sensitive decision-artifact content, regulated data (e.g., protected health information (PHI), financial records, juvenile records), privileged material, proprietary sources, or other payloads restricted by policy, contract, law, or workflow configuration, wherein conformance replay may be performed using evidence identifiers, handles, integrity proofs, and/or excerpt hashes without disclosing such raw payloads unless required by policy.

A58. Conformance Level: a named level (e.g., L0-L3) defined by a versioned conformance policy and associated with machine-checkable entry criteria specifying required receipt fields, required pin types, required replay checks, required gating evidence, and/or required monitoring predicates, such that the level is assertable only when the entry criteria are satisfied.

A59. Control Point: a locus of enforcement or gating in a workflow at which a downstream side effect is permitted, denied, delayed, or released based on a conformance outcome, including an API gateway, message-queue interceptor, database transaction hook, record-finalization hook, workflow-state transition guard, UI finalization gate, commit-token service, or functionally equivalent control-path mechanism.

A60. Commit Token/Authorization Token: a token, capability, lease, permit, or functionally equivalent artifact whose issuance, withholding, or revocation controls whether a downstream side effect can be committed, finalized, transmitted, executed, or otherwise externalized.

A61. Idempotency Key: a key or identifier used to ensure atomic and single-effect enforcement across retries, such that repeated requests cannot cause multiple externalized effects or bypass fail-closed routing.

A62. Minimum Receipt Set: a policy-defined set of one or more required receipts (or receipt digests) that must be present and deterministically evaluate to PASS for a specified action class or side-effect class before release is permitted.

A63. No-Dead-End Predicate: a policy-defined rule requiring that any non-PASS outcome deterministically yields reason codes sufficient to identify a remediation path or a bounded set of next actions, thereby preventing silent bypass or indefinite ambiguity.

A64. Trusted Compute Boundary: a remotely attestable execution boundary (e.g., TEE, HSM, audited sandbox) used to compute, sign, validate, or gate artifacts such that substitution is detectable under configured checks.

A65. Conformance Suite: a packaged set of deterministic test vectors and expected validator outputs bound to at least a policy pack identifier and a policy version digest, usable to determine conformance of a validator implementation.

A66. Deterministic Test Vector: a test input (including receipt fields and policy references) with an expected deterministic validator output comprising an expected outcome and expected reason-code identifiers.

A67. Expected Validator Output: the expected outcome and expected reason-code identifiers (and optionally expected predicate results) associated with a deterministic test vector.

A68. Implementation Under Test (IUT): a validator implementation, library, service, gateway, sidecar, or embedded module whose conformance is evaluated using a conformance suite.

A69. Conformance Certificate: a digitally signed object asserting that an IUT conforms to a versioned conformance profile, the digital signature being computed over a canonical encoding of at least a certificate core committing to at least a conformance suite identifier and conformance suite digest, a policy pack identifier and policy version digest, a validator identifier and validator digest, and a certificate validity condition, subject to the validity condition.

A70. Certificate Registry: a store that publishes certificates and, optionally, revocation records, and that may provide signed heads, inclusion proofs, and functional equivalents to support independent verification.

A71. Certificate Validity Condition: an expiry, revocation reference, revalidation cadence, regression-trigger rule, or functional equivalent rule controlling whether a conformance certificate is acceptable for reliance.

A72. High-Stakes Workflow/High-Stakes Domain: a workflow or domain in which machine-assisted decision artifacts can materially affect legally, clinically, financially, safety-critical, or rights-impacting outcomes, including by way of example and not limitation: healthcare administration, governance, adjudication and dispute resolution, critical infrastructure operations, biosecurity, or high-value financial or risk-management decisions.

A73. Approval Receipt/Release Receipt: a receipt (or receipt class) that commits to an authorization to release a downstream side effect (or to treat an assertion as approved), including at least a binding to the underlying decision artifact receipt (or digest) and to a policy version digest, and optionally to an approval authority identifier, a control point identifier/class, and enforcement evidence.

A74. Revocation Receipt/Supersession Receipt: a receipt (or receipt class) that commits to withdrawal, invalidation, or supersession of a previously issued approval receipt, badge, certificate, or conformance statement, including at least an identifier/digest of what is revoked or superseded, an effective time, and a revocation/supersession reason code.

A75. Approval Authority/Approver Class: an identity or class of entities permitted by policy to authorize release, including a human reviewer, oversight body, or policy-authorized automated service, without limiting the claims.

A76. Certification/Assertion State: a state of an asserted conformance claim or authorization, including CANDIDATE, APPROVED, ACTIVE, EXPIRED, REVOKED, or SUPERSEDED, as defined by policy and recorded via receipts or equivalent artifacts.

A77. Supersession: a replacement of a prior authorization or assertion by a newer one under an applicable policy version digest, optionally scoped by action class, control point class, or time window.

A78. Reliance Boundary: a control-path mechanism that determines whether an operation may proceed based on admissibility of relying on an asserted conformance artifact, including functional equivalents such as gateways, commit hooks, and finalization gates.

A79. Reliance Decision Record: a record or receipt that commits to at least a relied-upon object identifier/digest, a reliance boundary identifier/class, a reliance outcome (e.g., ALLOW/DENY/HOLD), and deterministic reason codes.

A80. Reliance State: a state associated with an asserted conformance artifact, including ACTIVE, EXPIRED, REVOKED, or SUPERSEDED, determined under policy rules including effective time and scope.

A81. Invalidation Epoch/Version Vector: a monotonic counter, epoch, version vector, or functionally equivalent mechanism used to propagate revocation/supersession state and prevent stale reliance.

A82. Override Receipt: a receipt that commits to a policy-authorized override of a non-ALLOW reliance outcome, including an override authority, scope, expiry, and reason code.

A83. Appeal Receipt: a receipt that commits to an appeal or dispute outcome affecting reliance, including an appealed object identifier/digest, an outcome identifier, an effective time, and an associated revocation/supersession reference.

A84. Conformance Context Digest (CCD): an integrity value computed over a canonical encoding of one or more conformance-boundary identifiers and/or digests (e.g., receipt schema digest, canonicalization_id, policy version digest, validator digest, reason-code registry digest, obligation-set registry digest), usable to deterministically detect substitution of boundary components.

A85. Canonicalization Identifier: an identifier that names a canonical encoding and/or canonicalization function used for digest computation and/or signature/MAC computation (e.g., JCS, deterministic CBOR/COSE, deterministic protobuf), enabling independent parties to reproduce canonicalized inputs.

A86. Reason-Code Registry: a registry or namespace defining deterministic reason-code identifiers and their semantics for conformance outcomes under a policy pack.

A87. Reason-Code Registry Digest: an integrity value computed over a canonical encoding of a reason-code registry (or a defined subset), usable to detect substitution or drift of reason-code semantics.

Appendix B—Reason Code Registry (Illustrative; Non-Limiting)

B0. Note. Reason codes are illustrative; implementations may add, merge, alias, or namespace codes while preserving deterministic mapping from conditions to outputs.

Receipt/Schema/Required Fields

B1. FORMAT_INVALID—receipt fails parsing or structural validation.

B2. SCHEMA_VERSION_UNSUPPORTED—schema identifier or schema digest not supported by validator.

B3. REQUIRED_FIELD_MISSING—required field absent under policy/obligation set.

B4. RECEIPT_DIGEST_MISMATCH—receipt digest does not match computed digest over defined fields.

Evidence Pinning/Snapshot/Access

B5. SOURCE_UNRETRIEVABLE—referenced evidence cannot be retrieved under configured access rules.

B6. SNAPSHOT_MISSING—referenced snapshot identifier cannot be resolved.

B7. SNAPSHOT_INTEGRITY_FAIL—snapshot digest or integrity check fails.

B8. EXCERPT_HASH_MISMATCH—excerpt hash mismatch for referenced excerpt.

B9. EVIDENCE_ID_INVALID—evidence identifier malformed or fails validation rules.

Assumptions/Support vs Inference

B10. MISSING_ASSUMPTIONS—policy requires explicit assumptions; absent or insufficient.

B11. ASSUMPTION_DRIFT—referenced assumption identifier points to updated/changed assumption incompatible with pinned context.

B12. INFERENCE_GAP—policy-required separation of supported statements vs inference fails.

Policy Pack/Selection/Staleness

B13. POLICY_PACK_MISSING—policy pack referenced by receipt is unavailable.

B14. POLICY_PACK_DIGEST_MISMATCH—policy pack digest mismatch.

B15. POLICY_ID_STALE—policy identifier is stale under freshness/staleness rules or changelog requirements.

B16. PROFILE_SELECTION_UNRESOLVED—domain profile selection cannot be determined from context.

Verifiable Log/Signed Head/Inclusion Proof

B17. SIGNED_HEAD_STALE—signed head violates freshness policy.

B18. INCLUSION_PROOF_INVALID—inclusion proof fails verification relative to head.

B19. HEAD_ROLLBACK_DETECTED—detected rollback, equivocation, or inconsistent log heads under verification rules.

Forecasting-Specific (Optional)

B20. MISSING_RESOLUTION_CRITERIA—forecast receipt missing resolution criteria required for PASS.

B21. RESOLUTION_WINDOW_INVALID—invalid or inconsistent horizon/time window under policy.

B22. SCORING_CONFIG_STALE—scoring configuration digest missing or stale under policy.

Side-Effect Gating/Enforcement

B23. SIDE_EFFECT_NOT_GATED—policy requires gating of specified side effect; enforcement evidence missing.

B24. HOLD_REQUIRED—policy requires HOLD when a specified prerequisite cannot be verified.

B25. VALIDATOR_DIGEST_MISMATCH—validator digest mismatch under configured checks.

B26. CHANGELOG_REQUIRED_MISSING—policy requires changelog; changelog pointer/content missing or unverifiable.

B27. ARTIFACT_DIGEST_MISMATCH—artifact digest does not match computed digest over a defined artifact subset.

B28. POLICY_SIGNATURE_INVALID—policy signature fails verification under configured checks.

B29. INVALID_SIGNATURE—signature fails/issuer not authenticated (receipt or conformance-result signature).

B30. NON_CANONICAL_ENCODING—digest mismatch to canonical encoding (illustrative alias of RECEIPT_DIGEST_MISMATCH).

B31. CONTINUITY_VERIFICATION_FAILURE—continuity/consistency proof missing or invalid (illustrative alias spanning INCLUSION_PROOF_INVALID and/or HEAD_ROLLBACK_DETECTED).

B32. STALE ANCHORING—freshness bound violated (illustrative alias of SIGNED_HEAD_STALE).

B33. LOG_EQUIVOCATION_SUSPECTED—divergent heads detected/equivocation suspected (illustrative alias of HEAD_ROLLBACK_DETECTED).

B34. POLICY_DRIFT_GUARD_FAILURE—policy id/version/hash mismatch or policy pack unavailable (illustrative alias spanning POLICY_PACK_MISSING, POLICY_PACK_DIGEST_MISMATCH, and/or POLICY_ID_STALE).

B35. MISSING_REQUIRED_RECEIPT—required receipt absent for workflow (illustrative refinement distinct from REQUIRED_FIELD_MISSING).

B36. VERIFICATION_PATH_UNAVAILABLE—proof/evidence endpoints unavailable (illustrative alias spanning SOURCE_UNRETRIEVABLE and/or SNAPSHOT_MISSING).

B37. EVIDENCE_RESOLUTION_OUT_OF_POLICY—evidence disclosure blocked by policy (distinct from SOURCE_UNRETRIEVABLE).

B38. CERTIFICATE_MISSING—required conformance certificate not present for validator acceptance.

B39. CERTIFICATE_EXPIRED—conformance certificate violates validity time window.

B40. CERTIFICATE_REVOKED—conformance certificate revoked under registry evidence.

B41. SUITE_DIGEST_MISMATCH—certificate suite digest does not match required suite digest.

B42. EXPECTED_OUTPUT_MISMATCH—IUT outputs differ from expected outputs for required test vectors.

B43. CERT_REGISTRY_HEAD_STALE—certificate registry head violates freshness policy.

B44. APPROVAL_RECEIPT_MISSING—policy requires an approval/release receipt; missing.

B45. APPROVAL_RECEIPT_INVALID—approval/release receipt fails integrity, scope, or authority checks.

B46. ASSERTION_REVOKED_OR_SUPERSEDED—a relied-upon approval/badge/certificate/statement is revoked or superseded under applicable policy.

B47. ASSERTION_EXPIRED—relied-upon approval/certification violates a validity window or effective-time rule.

B48. RELIANCE_SCOPE_VIOLATION—reliance request violates scope/tenant/jurisdiction bounds.

B49. REVOCATION_STATUS_UNCERTAIN—revocation/supersession completeness cannot be established (e.g., missing required registry evidence), yields HOLD.

B50. INCONSISTENT_HEADS_OR_EQUIVOCATION—reliance status verification detects rollback/equivocation/inconsistent heads, yields HOLD.

B51. INVALIDATION_EPOCH_STALE—reliance boundary cannot confirm required invalidation epoch/version vector, yields DENY or HOLD per policy.

B52. OVERRIDE_APPLIED—break-glass override used; override receipt required and logged.

B53. CONFORMANCE_CONTEXT_DIGEST_MISMATCH—conformance context digest does not match expected/required boundary commitments.

B54. REASON_CODE_REGISTRY_DIGEST_MISMATCH—reason-code registry digest mismatch under configured checks (distinct from VALIDATOR_DIGEST_MISMATCH).

Appendix C—Conformance Policy Packs & Domain Profiles (Constitution-Grade; Illustrative)

C1. Policy pack identity. A policy pack includes policy_id (policy pack identifier) and policy_version_digest, and optionally policy_namespace, effective_time, and changelog_pointer. In some embodiments, a policy pack is digitally signed by a policy issuer, and a receipt and/or conformance pack commits to a policy_issuer_id and/or policy_signature.

C2. Deterministic evaluation contract. A policy pack defines machine-checkable requirements and a deterministic mapping from verification conditions to {PASS|FAIL|HOLD} plus reason codes. Deterministic mapping is defined over a canonicalized subset of receipt fields and policy-pack fields; any modeled variability is reason-coded and time-stamped.

C3. Profiles. Non-limiting profiles may include: governance_profile, biosecurity_profile, healthcare_admin_profile, consumer_health_profile, critical_infra_profile, forecasting_profile, and general_profile.

C4. Obligation sets. A profile may reference one or more obligation sets, each defining:

required_fields (e.g., evidence_ids, snapshot_ids, assumptions, policy_version_digest)

required_pin_types (e.g., snapshot required vs evidence-id-only permitted)

minimum_replay_checks (e.g., snapshot retrievability, integrity checks, inclusion proof checks, freshness checks)

side_effect_gating_rules (which side effects must be gated on HOLD/FAIL)

revalidation_schedule (event-triggered and/or periodic)

badge_rules (issuance, expiry, revocation)

C5. Changelog requirement. A policy pack may require that policy changes be recorded in a changelog sufficient to support deterministic interpretation of policy version digests.

C6. Conformance levels (optional). A profile may define graded levels (illustrative):

L0 (receipt present; minimal)

L1 (pinned evidence identifiers+assumptions)

L2 (snapshots+integrity checks+gating)

L3 (verifiable log evidence+continuous monitoring+badge rules)

Each level is associated with machine-checkable entry criteria defined by the policy pack and/or obligation sets, such that a level is assertable only when the entry criteria are satisfied under the applicable policy version digest.

C7. Selection. Profile selection may be based on workflow context signals, including domain indicators, side-effect type, or artifact type, without limiting the claims.

C8. Healthcare administration modernization (CTC-aligned examples; illustrative; non-limiting).

C8.N Non-separability note (informative; non-limiting). The receipt-type names and rail-by-rail predicates in this subsection are illustrative configurations of the same RVAL receipt/validator/gating substrate under different profiles and obligation sets, and do not describe separate inventions.

C8.1 Example minimum receipts (per workflow). In some embodiments, a healthcare_admin profile defines a workflow identifier and an associated minimum receipt set, for example:

W1 Permit-Before-Action (DSI episode): {HTI_SR}.

W2 Prior Authorization: {ATR} (+{AOR} if appealed/overturned).

W3 Permit-to-Pay adjudication: {CTR+ATR+RCTR}+{HTI_SR+BGR} if AI-influenced; +{AOR/CR} if present.

W4 Permit-Before-Bill (AI-influenced): {BGR+HTI_SR}.

W5 Correction/recoupment: {CR} (+ {AOR} for appeal path).

C8.1A Illustrative receipt-type identifiers. HTI_SR, ATR, CTR, RCTR, BGR, AOR, and CR are illustrative identifiers for receipt types used in the examples and do not limit the claims; equivalent implementations may use different identifiers, namespaces, or decompositions while preserving deterministic evaluation semantics.

C8.2 Example required predicates (rail-by-rail). In some embodiments, a profile defines required predicate checks for each required receipt type, for example:

CORE (every required receipt): CANON_OK (digest); SIG_OK (issuer); POLICY_PIN OK (id/version/hash); CVL_OK (fresh+inclusion+continuity+reconcile); ID_BIND_OK.

Rail 1—HTI (HTI_SR; if AI/DSI): DSI_DECLARED_OK; PERMIT_OK; DSI PROV OK.

Rail 2—A-Prime (ATR/CTR; if PA_REQUIRED): ATR_VALID; BINDING_MATCH; GUARDRAILS_OK; TOCTOU_LATCH_OK; REPLAY AUTH OK.

Rail 3—RCM (RCTR): SUBGRAPH_RESOLVABLE; METRICS REPLAY OK; REPLAY POLICY MATCH.

Rail 4—HTI2 (BGR; if AI-influenced billing): AI_EVENT_CLASSIFIED; SAFETY_PRECONDS_OK; FAIL_CLOSED_ENFORCED.

Rail 5—Clawback/Correction (AOR/CR, when present): FORWARD_LINK_VALID; CPP_BOUNDED_OK (evidence+approval authorities+targets); SCOPE_IN_POLICY; SUPERSESSION_APPLIED.

C8.3 Illustrative note. Receipt type names, workflow identifiers, and predicate identifiers are illustrative and do not limit the claims. Equivalent implementations may use different names, namespaces, or predicate decompositions while preserving deterministic evaluation semantics.

Appendix D—Conformance Pack Format (Constitution-Grade; Illustrative)

D1. pack_id; pack_digest; pack_schema_id; pack_schema_digest

D2. receipt_id; receipt_digest; receipt_schema_id; schema_digest

D3. policy_id (policy pack identifier); policy_version_digest; changelog_pointer (optional); policy_pack_digest (optional)

D4. validator_id; validator_digest; reason_code_registry_id (optional);

reason_code_registry_digest (optional); canonicalization_id (optional);

conformance_context_digest (optional)

D5. conformance_result (or conformance_result_digest); outcome; evaluated_at; reason_code_ids; fail_closed_action; predicate_results (optional); badge_profile_id;

badge_profile_version; validator_id (optional); validator_version; validator_digest; assurance_schema_version (optional); conformance_result_signature (optional)

D6. receipt_store_head_id; signed_head (optional); inclusion_proof (optional);

freshness_policy_id (optional)

D6A. modeled_variability_parameters (optional)

D7. toolchain_ids; config_digests (optional)

D8. evidence_ids; snapshot_ids; excerpt_hashes (optional)

D9. assumption_ids; assumptions (optional)

D10. side_effect_gating_evidence (optional) (e.g., gating decision record pointer)

D10A. approval_receipt_id (optional); approval_receipt_digest (optional);

approval_authority_id/class (optional); approval_time-stamp (optional); approval_reason_codes (optional)

D10B. revocation_receipt_id (optional); revocation_receipt_digest (optional); revoked_object_id/digest (optional); revocation_effective_time (optional); revocation_reason_codes (optional)

D10C. reliance_state (optional) (e.g., ACTIVE/EXPIRED/REVOKED/SUPERSEDED); reliance_state_effective_time (optional); reliance_scope (optional)

D10D. reliance_decision_record_id (optional); reliance_decision_record_digest (optional); reliance_boundary_id/class (optional); reliance_outcome (optional); reliance_reason_code_ids (optional)

D10E. invalidation_epoch/version_vector (optional); invalidation_ack (optional); override_receipt_id/digest (optional); appeal_receipt_id/digest (optional)

D10F. commit_token_id (optional); commit_token_digest (optional); atomic_release_proof (optional)

D11. replay_harness_id (optional); replay_config_digest (optional)

D12. badge_id (optional); badge_state (optional)

D13. Signed Conformance Result (illustrative; non-limiting).

D13.1 In some embodiments, a conformance pack includes (or references) a digitally signed Conformance Result object, for example:

```
{
"badge_profile_id": "CB-1",
"badge_profile_version": "1.1",
"assurance_schema_version": "1.0",
"evaluated_at": "2026-01-02T00:00:00Z",
"outcome": "PASS",
"admissible_action": "AUTO PAY".
"enforcement_action": "RELEASE",
"fail_closed_action_on_nonpass": "HOLD",
"reason_code_ids": [ ],
"validator_id": "urn:rval:validator:reference",
"validator_version": "1.0.0",
"validator_digest": "sha256: [64hex]",
"predicate_results": { "CANON_OK": true,
"SIG_OK": true, "POLICY_PIN_OK": true,
"CVL_OK": true, "ID_BIND_OK": true },
"signature": "sig:<opaque>"
}
```

D14. Conformance Statement (optional).

D14.1 conformance_statement_id (optional); conformance_statement_digest (optional)

D14.2 claimed_level (e.g., L0-L3); declared_action_class; declared_scope_of_use

D14.3 covered_receipt_types; covered_control_points

D14.4 freshness_assumptions (e.g., freshness_policy_id; recency bounds)

D14.5 retention_window; out_of_scope_exclusions

D14.6 conformance_statement_signature (optional) bound to a canonical encoding of the statement fields D15. Auditor-mode replay and payload disclosure constraints (optional).

D15.1 audit_mode (e.g., OFFLINE_REPLAY)

D15.2 evidence_handles (authorized handles sufficient for replay checks under policy)

D15.3 payload_disclosure_policy (e.g., NO_RAW_PAYLOAD_BY_DEFAULT; RAW_PAYLOAD_ONLY_IF_REQUIRED_BY_POLICY)

D15.4 disclosure_reason_codes (optional) indicating why raw disclosure is required or why verification is constrained D16. RTES Evidence Pack (illustrative; non-limiting).

In some embodiments, an "RTES Evidence Pack" is a conformance pack that includes at least the receipt (or receipt digest), Conformance Statement (or digest), policy_id and policy_version_digest, validator_id and validator_digest, reason_code identifiers, and verifiable receipt-store evidence sufficient for independent replay, and optionally includes evidence handles enabling offline auditor-mode replay without disclosure of raw restricted payloads unless required by policy.

Appendix E—Receipt Schema (Constitution-Grade; Illustrative Fields)

E1. artifact_id; artifact_type; artifact_digest; artifact_pointer (optional)

E2. receipt_id (optional); receipt_digest; timestamps

E3. receipt_schema_id; schema_digest

E3A. canonicalization_id (optional)

E3B. conformance_context_digest (optional)

E4. evidence_ids; evidence_metadata (optional)

E5. snapshot_ids; snapshot_digests (optional)

E6. excerpt_hashes; excerpt_locators (optional)

E7. assumptions; assumption_ids

E8. policy_id; policy_version_digest; profile_id (optional); obligation_set_ids (optional)

E9. toolchain_ids (model_id; retriever_id; validator_id); config_digests

E10. conformance_result (optional); reason_codes (optional)

E10A. reason_code_registry_id (optional); reason_code_registry_digest (optional)

E11. receipt_store_head_id (optional); signed_head (optional); inclusion_proof (optional); freshness_policy_id (optional)

E12. Forecasting optional fields: forecast_record; resolution_criteria; time_horizon; scoring_digest; calibration_metadata (optional)

E13. Issuer authentication optional fields (illustrative; non-limiting).

E13.1 issuer_id (optional); issuer_key_id (optional); issuer_signature (optional); issuer_mac (optional).

E13.2 signature_alg_id (optional); mac_alg_id (optional); signature_timestamp (optional).

E13.3 canonicalization_id (optional) indicating a canonical encoding used for signature/MAC computation.

E13.4 key_rotation_ref (optional) and/or revocation_ref (optional) for issuer key lifecycle.

E14. Conformance Statement binding (optional).

E14.1 conformance_statement_id (optional); conformance_statement_digest (optional)

E14.2 claimed_level (optional); declared_action_class (optional); declared_scope_of_use (optional)

E14.3 covered_receipt_types (optional); covered_control_points (optional)

E15. Auditor-mode evidence handles and disclosure constraints (optional).

E15.1 evidence_handles (optional) enabling replay checks under policy without disclosing raw restricted payloads unless required E15.2 payload_disclosure_policy_id (optional) and/or disclosure_constraints (optional)

E16. Approval/revocation optional fields (illustrative; non-limiting):

E16.1 approval_authority_id/class (optional); approval_timestamp (optional); approved_action_class/control_point_class (optional)

E16.2 revoked_object_id/digest (optional); revocation_effective_time (optional); revocation_reason_code_ids (optional)

E16.3 supersession_ref (optional) linking to a newer approval/certification assertion (optional)

E17. Reliance lifecycle optional fields (illustrative; non-limiting):

E17.1 reliance_boundary_id/class (optional); reliance_outcome (optional); reliance_reason_code_ids (optional)

E17.2 reliance_state (optional); effective_time (optional); scope (optional); supersession_ref (optional)

E17.3 invalidation_epoch/version_vector (optional); invalidation_ack (optional)

E17.4 override_authority_id/class (optional); override_expiry (optional); override_reason_codes (optional)

E17.5 appeal_outcome_id (optional); appeal_effective_time (optional); appeal_ref (optional)

Appendix F—Proper Scoring & Calibration (Constitution-Grade; Illustrative)

F1. proper_score_type (binary/categorical/continuous/distributional)

F2. scoring_rule_id; scoring_config_digest

F3. score_value; score_timestamp; resolution_timestamp

F4. calibration_bins; bin_edges; bin_counts; observed_frequencies

F5. reliability_curve_points; calibration_error_metrics (optional)

F6. sample_size; confidence_intervals (optional)

F7. drift_metrics (e.g., score drift, calibration drift)

F8. replay_failure_rate; hold_rate; fail_rate

F9. robustness_delta under specified perturbation conditions (optional)

F10. evaluation_split_id to distinguish public/demo vs internal/withheld sets (optional; non-limiting)

Appendix G—Interoperability Mapping (Optional; Illustrative)

G1. General principle. A receipt or conformance pack may be represented as or referenced by external audit/event schemas without limiting the claims.

G2. receipt_reference: a stable pointer (URI/content-address/log index) to a stored receipt or conformance pack.

G3. Mapping may include (illustrative):

healthcare documents/provenance/audit events (e.g., DocumentReference/Provenance/AuditEvent equivalents), general provenance models (e.g., W3C PROV equivalents), telemetry/event pipelines (e.g., log/trace/span equivalents).

G4. external_event_id may bind external audit events to receipt identifiers.

G5. side_effect_event may encode gated downstream side effects and gating decisions.

Appendix H—Threat Model (Optional; Constitution-Grade)

H1. Source drift/link rot→snapshot+pinned identifiers+replay validation.

H2. Model/retriever update drift→continuous monitoring+drift reports+badge expiry/revocation.

H3. Assumption drift/silent prior changes→assumption identifiers+versioning+reason-coded drift.

H4. Citation laundering/circular citations→obligation sets requiring primary/seminal sources where applicable.

H5. Adversarial evidence ordering/cherry-picking→bounded tracing+reason-coded insufficiency.

H6. Snapshot substitution/tampering→snapshot integrity checks+digest mismatch reason codes.

H7. Receipt tampering→receipt digests+schema digests+deterministic validator.

H8. Policy pack substitution→policy_version_digest checks+policy pack digest mismatch codes.

H9. Signed-head rollback/equivocation→freshness policy+head rollback detection.

H10. Inclusion proof forgery→inclusion proof verification+invalid proof codes.

H11. Access-control denial/partial visibility→HOLD with reason-coded access condition.

H12. Benchmark gaming/incentive attacks→ (optional) controlled disclosure and separation of public vs withheld evaluation sets.

H13. DoS on validation dependencies→HOLD fail-closed routing to prevent unsafe side effects.

H14. Privacy leakage via receipts→optional minimization, tokenization, hashing, or privacy-preserving references while preserving replayability.

H15. Time-of-check/time-of-use mismatch→freshness windows+gated side effects+deterministic time-stamped checks.

H16. Hallucinated or unverifiable basis for legally or financially consequential decisions. Without replay-verifiable receipts and deterministic conformance checks, hallucinated citations, unverifiable rationales, or non-replayable inputs can enter legally or financially consequential decisions (e.g., adjudications, policy determinations, or payment decisions) with no machine-checkable way to challenge or reproduce the basis.

H17. Fragmented or implicit gating across microservices. When gating decisions are spread across implicit checks in multiple microservices, logs, or UIs, it becomes difficult to prove that unsafe side effects were consistently blocked before conformance. The disclosed fail-closed gating and gating decision records centralize and harden such control paths.

H18. Post-hoc log fabrication or scapegoating. In some adversarial or high-stakes settings, operators may attempt to fabricate or retroactively alter logs to justify a decision. Append-only receipt stores with signed heads and inclusion proofs constrain such behavior and enable independent verification.

Appendix I—Policy-Pull Mapping Table (Illustrative; Non-Limiting)

I0. Note. This appendix maps common regulatory/contractual obligation classes to obligation sets. Names are illustrative and do not limit the claims.

I1. Record-keeping/logging obligations→LOG_EVENTS+RETENTION+SIGNED_HEADS+INCLUSION_PROOFS I2. Post-deployment monitoring obligations→REVALIDATE_SCHEDULE+DRIFT_REPORT+BADGE_EXPIRY+BADGE_REVOCATION I3. High-stakes side-effect control (prevent unsafe automation)→SIDE_EFFECT_GATING+HOLD_ON_UNVERIFIABLE+HUMAN_REVIEW_ROUTE I4. Evidence integrity/provenance obligations→SNAPSHOT_REQUIRED+SNAPSHOT_INTEGRITY_CHECKS+EXCERPT_HASHES I5. Transparency of policy versioning→POLICY_PACK_VERSIONING+CHANGELOG_REQUIRED+POLICY_DIGEST_PINNING I6. Dispute/appeal readiness (auditable basis)→AUDIT_PACK_EXPORT+INDEPENDENT_REPLAY_SUPPORT I6A. Judicial or arbitration review bodies (illustrative).

External reviewers for adjudication workflows may include oversight bodies, regulators, arbitration administrators, or appellate courts or tribunals that consume conformance packs or adjudication receipts when reviewing, auditing, or hearing appeals of AI-assisted decisions.

I7. Forecasting/claims accuracy programs (non-limiting)→RESOLUTION_CRITERIA_REQUIRED+SCORING_REQUIRED+CALIBRATION_REPORTING I8. Vendor conformance certification programs→CONFORMANCE_PACK+BADGE_RULES+CONTINUOUS_MONITORING I9. Critical infrastructure assurance→FRESHNESS_POLICY_ENFORCED+FAIL_CLOSED_DEFAULT+HEAD_ROLLBACK_DETECTION I10. Healthcare admin modernization→REPLAYABLE_BASIS+SIDE_EFFECT_GATING+AUDIT_PACK_EXPORT I11. Judicial/arbitration AI governance (illustrative).
OBLIGATIONS: REPLAYABLE_BASIS+SIDE_EFFECT_GATING+AUDIT_PACK_EXPORT+CONTINUOUS_MONITORING+HUMAN_REVIEW_ROUTE. (e.g., AI-assisted draft opinions or awards must have replay-verifiable receipts, PASS under an applicable policy pack, and evidence that automated posting or enforcement was gated until conformance.)

I12. Model evaluation/leaderboard integrity (illustrative).
OBLIGATIONS: RESOLUTION_CRITERIA_REQUIRED+SCORING_REQUIRED+CALIBRATION_REPORTING+REPLAYABLE_BASIS.
(e.g., external evaluations, benchmarks, or leaderboards must tie published scores to receipts and scoring configurations that are replay-verifiable.)

Appendix J—Conformance Suites and Deterministic Test Vectors (Constitution-Grade; Illustrative)

J1. suite_id; suite_digest; suite_schema_id; suite_schema_digest

J2. policy_id; policy_version_digest; reason_code_registry_digest; canonicalization_id J3. vector_set_id; coverage_declaration (receipt_classes; action_classes; control_point_classes; levels optional)

J4. test vector record (illustrative fields):
vector_id; vector_digest
input_receipt (or receipt_fields_subset); input_policy_refs; modeled_variability_params (optional)
expected_outcome {PASS|FAIL|HOLD}
expected_reason_code_ids (ordered or set-defined)
expected_predicate_results (optional)

J5. Negative cases and unavailability cases (illustrative):
FAIL vectors (signature invalid, digest mismatch, schema mismatch)
HOLD vectors (external dependency unavailable, freshness unmet, access constrained)

J6. Canonical encoding and comparison rules:
canonicalize inputs/outputs before digesting and comparison mismatch report schema (outcome_mismatch; reason_code_mismatch (deterministic reason-code identifier mismatch); canon_mismatch; schema_mismatch)

J7. Suite signing and publication (optional):
suite_signature over canonical encoding of suite contents
suite publication reference (URI/content-address/log index)

Appendix K—Conformance Certificates and Certificate Registry (Constitution-Grade; Illustrative)

K1. certificate_id; certificate_digest; certificate_schema_id; certificate_schema_digest K2. suite_id; suite_digest; policy_id; policy_version_digest; validator_id; validator_digest; reason_code_registry_digest (optional); canonicalization_id (optional); conformance_context_digest (optional)

K3. coverage_declaration (receipt_classes; action_classes; control_points; levels optional)

K4. validity_condition:
issued_at; expires_at (optional)
revocation_ref (optional)
revalidation_cadence (optional)
regression_trigger_rules (optional)

K5. certificate_signature over canonical encoding of core fields

K6. certificate_registry evidence (optional):
registry_head_id (e.g., a signed-head identifier or a checkpoint identifier); signed_head; inclusion proof; freshness_policy_id K6A. cross_registry_ref (optional)

K7. revocation record (optional):
revoked_certificate_id; revocation_reason_code_ids; revoked_at; revocation_signature Appendix L—Authorized Evidence Handles & Disclosure Policy Schema (Constitution-Grade; Illustrative; Non-limiting)

L0. Note (evidentiary; non-limiting).

This Appendix provides example schemas and data structures for authorized evidence handles and disclosure-gated replay. These examples are illustrative and non-limiting; functionally equivalent implementations are intended to be covered unless expressly limited by the claims. Nothing in this Appendix limits claim scope; the claims control. In the event of any inconsistency between this Appendix and the body of the Specification, the body controls.

L1. Authorized Evidence Handle (AEH)—Core Object (illustrative schema fields).

In some embodiments, an authorized evidence handle (AEH) is a capability token, reference, locator, escrow key, lease, permit, or functionally equivalent artifact that enables retrieval and/or verification of evidence or snapshots under configured access and disclosure rules, without disclosing raw restricted payloads by default unless required by policy.

L1.1 handle identity and integrity
aeh_id (or handle_id)
aeh_digest (digest over canonical encoding of defined AEH fields)
aeh_schema_id; aeh_schema_digest
canonicalization_id (identifies canonical encoding used for digest/signature computation)
issuer_id; issuer_key_id (optional)
issued_at; expires_at (optional); not_before (optional)
revocation_ref (optional) and/or key_rotation_ref (optional)

L1.2 binding/scope constraints (anti-misuse; anti-substitution)

receipt_id and/or receipt_digest binding (optional)

conformance_pack_id and/or conformance_pack_digest binding (optional)

policy_id; policy_version_digest binding (optional but recommended)

validator_id; validator_digest binding (optional)

workflow_id/action_class/side_effect_class (optional)

control_point_class (optional; e.g., API_GATEWAY, UI_FINALIZATION, DB_COMMIT_HOOK)

declared_scope_of_use (optional; human-readable and/or machine-readable)

audience constraint: auditor_id, auditor_class, requester_class, tenant_id, or verified role claims device/runtime constraint (optional): client_attestation_id; boundary_measurement; environment id L1.3 permitted operations (proof-only by default; extensible)

permitted_ops list (non-limiting), examples:

GET_SNAPSHOT_DIGEST

GET_EXCERPT_HASH

VERIFY_INCLUSION (membership proof)

VERIFY_CONTINUITY (consistency/continuity proof)

VERIFY_SIGNATURE/MAC (issuer authentication artifact)

GET_SIGNED_HEAD (head/counter/checkpoint)

GET_REDACTION_PROOF (redaction/transform proof)

GET_ZK_PROOF (privacy-preserving proof object)

GET_ATTESTATION (signed access attestation/signed dependency attestation)

GET_COMMITMENT (commitment to withheld payload or escrow reference)

op_parameters_policy (optional): constraints on parameters per operation (e.g., allowed evidence namespaces)

L1.4 rate/usage constraints (anti-replay; abuse resistance)

non_replay_field: nonce/monotonic counter/one-time token id (optional)

max_redemptions (optional); redemption_window (optional)

rate_limit_policy_id (optional)

idempotency_binding (optional): idempotency_key bound to receipt_digest+requested_op+target_evidence_ref deny_on_anomaly (optional): anomaly_policy_id (non-limiting)

L1.5 cryptographic protections (illustrative; non-limiting)

signature or MAC over canonical encoding of defined AEH fields encryption/wrapping fields (optional): wrapped_key, escrow_key_ref, envelope_alg_id proof_request_template_id (optional): template defining expected verification artifacts for an auditor-mode replay L2. Evidence Handle Redemption Request (illustrative schema fields).

In some embodiments, an AEH is redeemed (used) by submitting a redemption request to an evidence service, escrow service, snapshot service, or functionally equivalent verifier endpoint.

redemption_request_id aeh_id (or ach_reference)

requester_id (optional); requester_attestation (optional); requester_role_claims (optional)

audit_mode indicator (e.g., OFFLINE_REPLAY; REGULATOR_REPLAY; INTERNAL_REPLAY)

requested_op (one of permitted_ops or functionally equivalent)

target_evidence_ref (evidence_id; snapshot_id; excerpt_locator; content_address; log_index; or equivalent)

request_nonce/request_counter (optional)

purpose_code (optional): reason for access (non-limiting; may be policy-required)

timestamp request_signature/MAC (optional)

L3. Evidence Handle Redemption Response (proof-bearing; no-raw by default).

In some embodiments, redemption returns verification artifacts sufficient for replay checks without disclosing raw restricted payloads unless required by policy.

L3.1 response envelope redemption_response_id aeh_id status: OK|DENIED|HOLD (or functional equivalents)

evaluated_at timestamp disclosure_policy_id (optional); policy_version_digest (optional)

reason_code_ids (optional; deterministic, machine-readable)

response_signature/MAC (optional)

L3.2 verification artifacts (non-limiting examples)

snapshot_digest and/or snapshot_integrity_attestation excerpt_hash and/or excerpt_hash_attestation signed_head (head digest+timestamp+signer_id) and/or head_id inclusion_proof (membership witness/Merkle proof/accumulator proof/functional equivalent)

continuity_proof (consistency proof/append-only evolution proof/functional equivalent)

redaction proof (proof that a disclosed transform corresponds to an underlying committed payload)

zk_proof (zero-knowledge proof object supporting a predicate without revealing payload)

dependency_attestation (signed statement about dependency availability or content-address resolution)

access_attestation (signed record that access was performed under given constraints)

withheld_payload_commitment (commitment to a withheld raw payload, escrow reference, or sealed blob reference)

L3.3 disclosure variants (optional; non-limiting)

disclosed payload (optional; only if required_by_policy and authorized)

disclosed_payload_transform (optional): redaction/masking/tokenization applied, with transform_id and proof if required disclosure_constraints_echo (optional): what was permitted/denied and why (machine-readable)

L4. Payload Disclosure Policy (PDP)/Disclosure Constraints (illustrative schema).

In some embodiments, disclosure is governed by a payload disclosure policy that defaults to no raw restricted payload and permits raw disclosure only under specified conditions.

disclosure_policy_id; disclosure_policy_digest policy_id; policy_version_digest default_rule (illustrative): NO_RAW_PAYLOAD_BY_DEFAULT allow_raw_conditions (optional; non-limiting): REQUIRED_BY_POLICY; LEGAL_MANDATE; REGULATOR_CLASS; BREAK_GLASS break_glass_policy (optional): approvals required; audit trail requirements; time-bounded release permitted_transformations (optional): REDACT, MASK, HASH_ONLY, TOKENIZE, PARTIAL_REVEAL, SUMMARY_ONLY minimum_verification_artifacts (optional): artifacts required even when raw is disclosed (e.g., snapshot_digest+head proof)

retention_window for disclosed artifacts (optional)

jurisdiction_or_tenant constraints (optional)

forbidden_payload_classes (optional)

disclosure_reason_codes mapping (optional): deterministic mapping from constraints to reason_code_ids L5. Access Receipt/Access Log Event (repudiation resistance; illustrative schema).

In some embodiments, each redemption attempt emits an access receipt (or log event) that is signed and optionally stored in a verifiable log.

access_id; access_digest; access_schema_id; access_schema_digest ach_id; redemption_request_id; redemption_response_id requester_id and/or requester_class; auditor_id/auditor_class (optional)

policy_id; policy_version_digest; disclosure_policy_id (optional)

requested_op; target_evidence_ref (or digest)

outcome status (OK/DENIED/HOLD)+reason_code_ids timestamps: requested_at; decided at returned_artifact_digests (digests of verification artifacts returned; not raw)

access_signature/MAC optional publication evidence: access_log_head_id; signed_head; inclusion_proof (if access events are logged in a verifiable log)

L6. Evidence Handle Registry/Certificate Registry Interop (optional; illustrative).

In some embodiments, AEHs, conformance certificates, and revocation records are published to one or more registries (which may be the same or different) that provide signed heads and inclusion proofs.

registry_id; registry_schema_id; registry_schema_digest head_id; signed_head (head_digest; timestamp; signer_id; signature)

inclusion_proof and/or continuity_proof for published artifacts freshness_policy_id and recency bounds for acceptable heads anti-equivocation features (optional): witness/monitor publication; gossip; consistency checks cross_registry_ref (optional)

L7. Deterministic reason codes for handle/disclosure failures (illustrative; non-limiting; may map to Appendix B).

Implementations may use Appendix B reason codes and/or namespace additional codes. Non-limiting examples:

EVIDENCE_HANDLE_INVALID—handle fails parsing/verification

EVIDENCE_HANDLE_EXPIRED—validity window violated

EVIDENCE_HANDLE_REVOKED—revocation record or rule indicates revoked

AUDIENCE_MISMATCH—requester/auditor not within audience constraint

SCOPE_VIOLATION—requested_op or target_evidence_ref out of scope

DISCLOSURE_DENIED—disclosure policy denies requested payload class

RAW_DISCLOSURE_REQUIRED_BY_POLICY—raw disclosure required but not authorized (yields HOLD or DENIED per policy)

REDEMPTION_PATH_UNAVAILABLE—evidence endpoints unavailable (modeled variability; HOLD)

ACCESS_LOGGING_FAILED—required access receipt/logging could not be completed (HOLD by default in high-stakes profiles)

PROOF_OBJECT_MISSING_OR_INVALID—required proof object missing/invalid (HOLD or FAIL per policy)

L8. Canonical encodings and "functional equivalents" (scope broadening note).

Canonicalization_id may refer to JSON canonicalization, CBOR/COSE canonical forms, deterministic protobuf encodings, or functionally equivalent canonical encodings. Membership proofs may include Merkle proofs, accumulators, or functional equivalents. Signatures may include digital signatures, MACs, HSM-protected attestations, TEE attestations, or functional equivalents. Handles may be expressed as pre-signed URLs, capability tokens, escrow references, content-address pointers, or functional equivalents.

L9. Illustrative objects (non-limiting examples).

L9.1 AEH (illustrative fields; values are examples only)

```
{
"aeh_id": "urn:rval:aeh:7f3c...",
"aeh_schema_id": "urn:rval:schema:aeh:1.0",
"aeh_digest": "sha256:<64hex>",
"canonicalization_id": "urn:rval:canon:jcs",
"issuer_id": "urn:rval:issuer:escrow-service",
"issued_at": "2026-01-08T00:00:00Z",
"expires_at": "2026-02-08T00:00:00Z",
"receipt_digest": "sha256:<64hex>",
"policy_version_digest": "sha256:<64hex>",
"audience": { "auditor_class": "INDEPENDENT_VERIFIER" },
"permitted_ops": ["VERIFY_INCLUSION", "GET_SIGNED_HEAD",
"GET_EXCERPT_HASH"],
"max_redemptions": 50,
"revocation_ref": "urn:rval:revocations:latest",
"signature": "sig:<opaque>"
}
```

L9.2 Redemption Response (Proof-Only; Illustrative)

```
{
"status": "OK",
"reason_code_ids": [ ],
"policy_version_digest": "sha256:<64hex>"
"signed_head": { "head_digest": "sha256:<64hex>",
"timestamp": "2026-01-08T00:00:10Z",
"signature": "sig:<opaque>" },
"inclusion_proof": "proof:<opaque>",
"excerpt_hash": "sha256:<64hex>",
"access_attestation": "attest:<opaque>",
"response_signature": "sig:<opaque>"
}
```

The invention claimed is:

1. A computer system comprising one or more processors and non-transitory memory storing instructions that, when executed by the one or more processors, cause the system to:

(a) obtain a conformance suite comprising deterministic test vectors and expected validator outputs for a versioned conformance profile, the versioned conformance profile being bound to at least a policy pack identifier and a policy version digest;

(b) provide at least a subset of the deterministic test vectors to an implementation under test (IUT) configured to validate replay-verifiable conformance receipts;

(c) receive, from the IUT, test-vector outputs each comprising (i) an outcome selected from PASS, FAIL, or HOLD and (ii) one or more deterministic reason-code identifiers associated with a reason-code registry;

(d) compare the test-vector outputs to the expected validator outputs to determine whether the IUT conforms to the versioned conformance profile; and (e) in response to determining that the IUT conforms, generate a conformance certificate, the conformance certificate comprising:

(A) a certificate core; and (B) a digital signature computed over a canonical encoding of at least the certificate core;

wherein the certificate core commits to at least:

(i) a conformance suite identifier and a conformance suite digest, each for the conformance suite, (ii) the policy pack identifier and the policy version digest, (iii) a validator identifier for the IUT and a validator digest of the IUT, and (iv) a certificate validity condition comprising at least one of a validity time window, a revocation reference, a revalidation cadence, or a regression-trigger rule.

2. The system of claim 1, wherein providing the deterministic test vectors comprises providing at least one negative-case test vector expected to yield FAIL and at least one unavailability-case test vector expected to yield HOLD.

3. The system of claim 1, wherein the expected validator outputs include expected deterministic reason-code identifiers, and wherein comparing comprises comparing both the outcome and the deterministic reason-code identifiers.

4. The system of claim 1, further comprising deterministically canonicalizing at least one of (i) the deterministic test vectors, (ii) the test-vector outputs, or (iii) the expected validator outputs, prior to the comparing.

5. The system of claim 1, wherein the conformance suite further comprises a deterministic evaluation contract that specifies, for the versioned conformance profile bound to the policy pack identifier and the policy version digest, a deterministic mapping from verification conditions specified by the versioned conformance profile to the outcome and the deterministic reason-code identifiers.

6. The system of claim 1, wherein the conformance certificate further commits to:

(i) a reason-code registry identifier and a reason-code registry digest associated with the versioned conformance profile;

(ii) a canonicalization identifier; and (iii) a conformance context digest computed over a canonical encoding, defined by the canonicalization identifier, of at least:

(A) the conformance suite identifier and the conformance suite digest, (B) the policy pack identifier and the policy version digest, (C) the validator identifier and the validator digest, and (D) the reason-code registry identifier and the reason-code registry digest, wherein substitution of any committed component is deterministically detectable.

7. The system of claim 1, further comprising publishing the conformance certificate or a conformance certificate digest to a certificate registry.

8. The system of claim 7, wherein the certificate registry is a verifiable certificate registry that publishes signed heads or functionally equivalent integrity-protected checkpoints.

9. The system of claim 8, further comprising generating, for the conformance certificate, an inclusion proof verifiable relative to at least one of a signed head or an integrity-protected checkpoint of the certificate registry.

10. The system of claim 8, further comprising enforcing a freshness policy for acceptance of the conformance certificate by requiring that at least one of a signed head or an integrity-protected checkpoint used for verification satisfies a recency bound.

11. A computer-implemented method comprising:

(a) obtaining a conformance suite comprising deterministic test vectors and expected validator outputs for a versioned conformance profile bound to at least a policy pack identifier and a policy version digest;

(b) executing, against an implementation under test (IUT), at least a subset of the deterministic test vectors, the IUT being configured to validate replay-verifiable conformance receipts;

(c) receiving test-vector outputs from the IUT, the test-vector outputs comprising an outcome selected from PASS, FAIL, or HOLD and one or more deterministic reason-code identifiers associated with a reason-code registry;

(d) comparing the test-vector outputs to the expected validator outputs to determine conformance of the IUT to the versioned conformance profile; and (e) upon determining conformance, generating a conformance certificate, the conformance certificate comprising:

(A) a certificate core; and (B) a digital signature computed over a canonical encoding of at least the certificate core;

wherein the certificate core commits to at least a conformance suite identifier for the conformance suite and a conformance suite digest of the conformance suite, the policy pack identifier and the policy version digest, a validator identifier for the IUT and a validator digest of the IUT, and a certificate validity condition comprising at least one of a validity time window, a revocation reference, a revalidation cadence, or a regression-trigger rule.

12. The method of claim 11, wherein the comparing comprises comparing both outcomes and deterministic reason-code identifiers against expected values.

13. The method of claim 11, further comprising deterministically canonicalizing at least one of the deterministic test vectors or the test-vector outputs prior to the comparing.

14. The method of claim 11, further comprising publishing the conformance certificate or a digest thereof to a verifiable certificate registry that publishes signed heads or functionally equivalent integrity-protected checkpoints.

15. The method of claim 14, further comprising generating an inclusion proof that the conformance certificate is included under at least one of a signed head or an integrity-protected checkpoint of the verifiable certificate registry.

16. The method of claim 14, further comprising accepting the conformance certificate only when at least one of a signed head or an integrity-protected checkpoint used for verification satisfies a recency bound.

17. The method of claim 11, further comprising performing a regression run by re-executing at least a subset of the deterministic test vectors against the IUT after at least one of a validator update, a policy pack revision, a reason-code registry revision, or a canonicalization revision.

18. The method of claim 17, further comprising, based on the regression run, generating a revocation record that revokes the conformance certificate when the IUT no longer conforms to the versioned conformance profile.

19. The method of claim 18, further comprising publishing the revocation record or a revocation record digest to a certificate registry.

20. The method of claim 11, wherein the conformance certificate includes a declared coverage that identifies at least one of a receipt type class, a declared action class, or a control-point class for which the IUT is certified.

21. The method of claim 11, further comprising generating a procurement-ready acceptance-test package that includes at least the deterministic test vectors, the expected validator outputs, and at least one of a deterministic evaluation contract or a mismatch-report schema usable to determine conformance.

22. A non-transitory computer-readable medium storing instructions that, when executed by one or more processors, cause the one or more processors to perform operations comprising:

(a) obtaining a conformance suite comprising deterministic test vectors and expected validator outputs for a versioned conformance profile bound to at least a policy version digest and, optionally, a policy pack identifier;

(b) executing the deterministic test vectors against an implementation under test (IUT) configured to validate replay-verifiable conformance receipts;

(c) comparing outputs from the IUT to the expected validator outputs to determine whether the IUT conforms to the versioned conformance profile; and (d) upon determining conformance, generating a conformance certificate, the conformance certificate comprising:

(A) a certificate core; and (B) a digital signature computed over a canonical encoding of at least the certificate core;

wherein the certificate core commits to at least a conformance suite digest, the policy version digest, a validator digest of the IUT, and a certificate validity condition.

23. The computer-readable medium of claim 22, wherein the operations further comprise publishing the conformance certificate or a conformance certificate digest to a certificate registry.

24. The computer-readable medium of claim 23, wherein the certificate registry publishes signed heads or functionally equivalent integrity-protected checkpoints and supports inclusion proofs verifiable relative to at least one of a signed head or an integrity-protected checkpoint.

25. The computer-readable medium of claim 24, wherein the operations further comprise enforcing a freshness policy by rejecting verification decisions that rely on at least one of a signed head or an integrity-protected checkpoint that violates a recency bound.

26. The computer-readable medium of claim 22, wherein the operations further comprise generating a conformance certificate validity condition that includes at least one of an expiry time, a revocation reference, a revalidation cadence, or a regression-trigger rule.

27. The computer-readable medium of claim 22, wherein the operations further comprise generating a certificate publication evidence artifact that includes at least a conformance certificate digest and at least one of (i) a signed-head identifier, (ii) a checkpoint identifier, or (iii) an inclusion proof, usable for independent verification of publication of the conformance certificate.

28. The computer-readable medium of claim 22, wherein the operations further comprise producing a mismatch report when the IUT does not conform, the mismatch report identifying at least one of an outcome mismatch or a deterministic reason-code identifier mismatch relative to the expected validator outputs.

29. The computer-readable medium of claim 22, wherein the operations further comprise binding the conformance certificate to a policy pack identifier and a policy version digest such that policy-pack substitution is deterministically detectable.

30. The computer-readable medium of claim 22, wherein the operations further comprise generating a machine-readable certification assertion that is verifiable by an independent verifier using at least the conformance certificate and at least one of a signed head or an integrity-protected checkpoint of a certificate registry.

\* \* \* \* \*